US011082986B2

(12) United States Patent
Liang et al.

(10) Patent No.: US 11,082,986 B2
(45) Date of Patent: Aug. 3, 2021

(54) CHANNEL STATE INFORMATION PROCESSING METHOD AND APPARATUS, AND SYSTEM

(71) Applicant: HUAWEI TECHNOLOGIES CO., LTD, Shenzhen (CN)

(72) Inventors: Jinyao Liang, Shenzhen (CN); Ting Wang, Shanghai (CN); Yuanjie Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/504,264

(22) Filed: Jul. 6, 2019

(65) Prior Publication Data

US 2019/0335475 A1 Oct. 31, 2019

Related U.S. Application Data

(63) Continuation of application No. PCT/CN2018/071634, filed on Jan. 5, 2018.

(30) Foreign Application Priority Data

Jan. 6, 2017 (CN) .......................... 201710011453.8
May 5, 2017 (CN) .......................... 201710314221.X
Aug. 11, 2017 (CN) .......................... 201710687469.0

(51) Int. Cl.
*H04W 72/08* (2009.01)
*H04L 5/00* (2006.01)
(Continued)

(52) U.S. Cl.
CPC ......... *H04W 72/082* (2013.01); *H04L 5/0035* (2013.01); *H04L 5/0053* (2013.01);
(Continued)

(58) Field of Classification Search
CPC ........... H04W 72/082; H04W 72/0413; H04W 72/042; H04L 5/0035; H04L 5/0053; H04L 5/1423
See application file for complete search history.

(56) References Cited

U.S. PATENT DOCUMENTS

2015/0131563 A1  5/2015  Guo et al.
2017/0155491 A1  6/2017  Dai et al.
(Continued)

FOREIGN PATENT DOCUMENTS

CN  102291764 A  12/2011
CN  102468927 A  5/2012
(Continued)

OTHER PUBLICATIONS

LG Electronics: "Discussion on interference measurement and reporting", 3GPP Draft; R1-1611823, vol. RAN WG1, no. Reno, USA; Nov. 2016, XP051175792. total 6 pages.
(Continued)

Primary Examiner — Eric Myers

(57) ABSTRACT

Embodiments of the present invention provide a channel state information measurement method, including: receiving, by user equipment, configuration information for channel state information measurement from a radio network device, where the configuration information includes information about a resource for channel state information measurement and indicates information about a measurement attribute of the resource, and the measurement attribute includes channel measurement, or X types of interference measurement, or channel measurement and X types of interference measurement, where X is an integer greater than or equal to 1; and measuring, by the user equipment, channel state information based on the configuration information, and feeding back the channel state information. The method is intended to meet different requirements for channel state
(Continued)

information measurement in different scenarios of coordinated multipoint in a future network.

23 Claims, 7 Drawing Sheets

(51) Int. Cl.
   *H04L 5/14* (2006.01)
   *H04W 72/04* (2009.01)
(52) U.S. Cl.
   CPC ......... *H04L 5/1423* (2013.01); *H04W 72/042* (2013.01); *H04W 72/0413* (2013.01)

(56) References Cited

U.S. PATENT DOCUMENTS

| | | | |
|---|---|---|---|
| 2017/0347284 A1 | 11/2017 | Wang et al. | |
| 2018/0145735 A1 | 5/2018 | Chen et al. | |

FOREIGN PATENT DOCUMENTS

| | | |
|---|---|---|
| CN | 103580819 A | 2/2014 |
| CN | 106160825 A | 11/2016 |
| EP | 2852084 A1 | 3/2015 |
| WO | 2015184707 A1 | 12/2015 |
| WO | 2016131176 A1 | 8/2016 |
| WO | 2016169304 A1 | 10/2016 |

OTHER PUBLICATIONS

LG Electronics: "Remaining issues on CQI definition and IMR", 3GPP Draft; R1-123515, vol. RAN WG1, no. Qingdao, China, Aug. 2012, XP050661393. total 6 pages.

Qualcomm Incorporated,"Details of CSI framework",3GPP TSG RAN WG1 NR Ad-Hoc#2 R1-1711162,Jun. 27-30, 2017,Qingdao, China,total 7 pages.

ZTE,"On CSI framework details",3GPP TSG RAN WG1 NR AdHoc#2 R1-1710187,Qingdao, China, Jun. 27-30, 2017, total 13 pages.

3GPP TS 36.212 V14.1.1 (Jan. 2017);3rd Generation Partnership Project;Technical Specification Group Radio Access Network;Evolved Universal Terrestrial Radio Access (E-UTRA);Multiplexing and channel coding(Release 14);total 149 pages.

3GPP TS 36.213 V14.1.0 (Dec. 2016);3rd Generation Partnership Project;Technical Specification Group Radio Access Network;Evolved Universal Terrestrial Radio Access (E-UTRA);Physical layer procedures(Release 14);total 414 pages.

CHANNEL STATE INFORMATION PROCESSING METHOD AND APPARATUS, AND SYSTEM

CROSS-REFERENCE TO RELATED APPLICATIONS

This application is a continuation of International Application No. PCT/CN2018/071634, filed on Jan. 5, 2018, which claims priority to Chinese Patent Application No. 201710687469.0, filed on Aug. 11, 2017 and Chinese Patent Application No. 201710314221.X, filed on May 5, 2017, and Chinese Patent Application No. 201710011453.8, filed on Jan. 6, 2017, The disclosures of the aforementioned applications are hereby incorporated by reference in their entireties.

TECHNICAL FIELD

The present invention relates to the field of communications technologies, and in particular, to a channel state information processing method and apparatus, and a system.

BACKGROUND

A next-generation mobile communications system requires high-capacity and high-quality data transmission. A multiple-input multiple-output (MIMO) technology is considered as one of key technologies for achieving future high-speed data transmission, and has broad application prospects in 4th generation (4G) and 5th generation (5G) mobile communications systems. A plurality of transmit antennas of a conventional centralized MIMO system are concentrated on a base station (BS) side. However, a plurality of transmit antennas of a distributed MIMO system are distributed in different geographical locations. Each pair of transceiver links of the distributed MIMO system is more independent, and the distributed MIMO system has advantages such as high capacity, low power consumption, better coverage, and low electromagnetic damage to a human body and is considered as one of candidate solutions for a future wireless communications system. In the case of distributed MIMO, coordinated multipoint transmission (CoMP) is considered as an effective method to resolve an inter-cell interference problem and improve an edge user throughput. A plurality of neighboring cells in a CoMP technology can jointly process or coordinate communication with edge users, to avoid an interference and improve an edge user throughput. Downlink CoMP technologies mainly include joint transmission (JT), coordinated scheduling and beamforming (CS/CB), and dynamic point selection/dynamic point blanking (DPS/DPB). To implement such CoMP scheduling, a serving base station needs to know a status of a downlink channel from each station to target user equipment. In LTE specifications, a reference signal is provided, namely, a CSI reference signal (CSI-RS), which is used by a terminal to obtain CSI in transmission modes 9 and 10. UE estimates a channel by measuring a specific CSI-RS, and obtains CSI and reports the CSI to a serving base station through a physical uplink control channel (PUCCH). The serving base station is a base station to which a serving cell belongs. The reported CSI may include one or a combination of more of a channel quality indicator (CQI), a rank indicator (RI), and precoding matrix indicator (PMI) information. To configure the UE to receive and process a specified CSI-RS and provide required feedback information, the base station may instruct the UE by configuring higher layer signaling, such as radio resource control (RRC) signaling.

The protocol 3GPP TS36.213 proposes using a non-zero power NZP (non-zero power) CSI-RS for channel measurement and using a zero power ZP (zero power) CSI-RS for interference measurement. However, such settings cannot meet different requirements for channel state information measurement in different scenarios of coordinated multipoint in a future network such as an NR (new radio) network. Therefore, how to make channel state information measurement meet requirements of a plurality of scenarios in coordinated multipoint is an urgent problem to be resolved.

In addition, in some scenarios such as coordinated multipoint, user equipment needs to report a plurality of pieces of CSI to a network device, so that the network device determines and decides specific coordination and scheduling based on the plurality of pieces of CSI. Therefore, another solution is needed to resolve a problem of triggering and reporting the plurality of pieces of CSI.

SUMMARY

Embodiments of the present invention provide a channel state information measurement method and apparatus, a communications system, and a terminal, so as to meet different requirements for channel state information measurement in different scenarios of coordinated multipoint in a future network.

According to a first aspect, an embodiment of the present invention provides a channel state information measurement method, including:

receiving, by user equipment, configuration information for channel state information measurement from a radio network device, where the configuration information includes information about a resource for channel state information measurement and indicates information about a measurement attribute of the resource, and the measurement attribute includes channel measurement, or X types of interference measurement, or channel measurement and X types of interference measurement, where X is an integer greater than or equal to 1; and measuring, by the user equipment, channel state information based on the configuration information, and feeding back the channel state information.

Because there is more than one type of interference measurement, a measurement behavior on a UE side can be indicated more accurately as required.

According to a second aspect, an embodiment of the present invention provides a channel state information measurement method, including:

sending, by a first radio network device, configuration information for channel state information measurement to user equipment, where the configuration information includes information about a resource for channel state information measurement and indicates information about a measurement attribute of the resource, and the measurement attribute includes channel measurement, or X types of interference measurement, or channel measurement and X types of interference measurement, where X is an integer greater than or equal to 1; and receiving, by a second radio network device, channel state information from the user equipment, where the channel state information is obtained based on the configuration information, and the second radio network device and the first radio network device are the same or different.

With reference to the first aspect or the second aspect, the information about the resource for channel state information measurement includes information about resources available for channel measurement and information about a resource for interference measurement, and the configuration information further includes second indication information, to indicate a quantity M of resources that are actually used for channel measurement, where M is an integer not less than 1; or the information about the resource for channel state information measurement includes information about resources for channel measurement and information about resources available for interference measurement, and the configuration information further includes third indication information, to indicate a quantity N of resources that are actually used for interference measurement, where N is an integer not less than 0; or the information about the resource for channel state information measurement includes information about resources available for channel measurement and information about resources available for interference measurement, the configuration information further includes second indication information and third indication information, the second indication information is used to indicate a quantity M of resources that are actually used for channel measurement, and the third indication information is used to indicate a quantity N of resources that are actually used for interference measurement, where M is an integer not less than 1, and N is an integer not less than 0.

The measuring, by the user equipment, channel state information based on the configuration information, and feeding back the channel state information includes:

determining, by the user equipment based on the second indication information, the M resources that are actually used for channel measurement in the resources available for channel state information, and performing channel state information measurement and feedback based on the M resources that are actually used for channel measurement.

Optionally, performing the channel state information measurement based on the resources that are actually used for channel measurement includes: performing channel measurement on the resources that are actually used for channel measurement. For example, performing the channel state information measurement based on the resources that are actually used for channel measurement includes: performing channel measurement on the resources that are actually used for channel measurement and performing interference measurement on a resource other than the M resources in the resources available for channel state information measurement.

Optionally, the measuring, by the user equipment, channel state information based on the configuration information, and feeding back the channel state information includes:

determining, by the user equipment based on the third indication information, the N resources that are actually used for interference measurement in the resources available for channel state information, and performing channel state information measurement and feedback based on the resources for channel measurement, where performing the channel state information measurement based on the resources for channel measurement includes: performing channel measurement on the resources for channel measurement and performing interference measurement on the N resources.

Optionally, that the configuration information indicates information about a measurement attribute of the resource includes:

the configuration information includes first indication information used to indicate the measurement attribute; or a resource or format of the configuration information is used to indicate the measurement attribute of the resource.

Optionally, the X types of interference measurement include at least one of measuring an interference by using a zero power reference signal, obtaining one or more strongest interferences by using a resource of a non-zero power channel state information reference signal, obtaining one or more weakest interferences by using a resource of a non-zero power channel state information reference signal, obtaining an unprecoded interference by using a resource of a non-zero power channel state information reference signal, obtaining all interferences corresponding to all selectable precoding matrices in an available codebook by using a resource of a non-zero power channel state information reference signal, obtaining a non-strongest or -weakest interference corresponding to a specific precoding matrix by using a resource of a non-zero power channel state information reference signal, and obtaining a precoded interference by using a non-zero power demodulation reference signal.

Optionally, there is at least one resource for channel state information measurement, the first indication information used to indicate the measurement attribute of the resource includes several elements, and each of the several elements is used to indicate a measurement attribute of each of the resources. For example, each element includes at least one bit, and a quantity of bits is related to a quantity of types of measurement attributes.

Optionally, the resources for channel state information measurement have one measurement attribute, or have more than one measurement attribute. Specifically, a resource identifier (ID) is used to identify a resource for channel state information measurement, one piece of first indication information is used to indicate one type of measurement attribute, and one resource identifier has one piece of first indication information, or has more than one piece of first indication information. For example, the first indication information may be in a manner of a bitmap or a measurement attribute index.

Optionally, one type of measurement attribute corresponds to one resource for channel state information measurement, or one type of measurement attribute corresponds to more than one resource for channel state information measurement. Specifically, a resource identifier (ID) is used to identify a resource for channel state information measurement, and the first indication information used to indicate a measurement attribute of the one or more than one resource for channel state information measurement may include a resource identifier of the one or more than one resource that is used for channel state information measurement and that has the measurement attribute, or may include several bits, where each of the several bits is used to indicate whether each resource has the measurement attribute.

Optionally, there is more than one measurement attribute, and each of the more than one measurement attribute has corresponding first indication information.

Optionally, there are at least two resources corresponding to the channel measurement in the measurement attributes, and the measuring, by the user equipment, channel state information based on the configuration information, and feeding back the channel state information includes:

measuring and feeding back, by the user equipment, channel state information based on at least one of the at least two resources, where the measurement includes performing channel measurement on the at least one of the at least two resources and performing interference measurement on a resource other than the at least one of the at least two resources for channel measurement.

Optionally, the information about the resource for channel state information measurement includes information about resources available for channel measurement and information about resources for interference measurement, and the configuration information further includes fourth indication information, to indicate a quantity Y of transmission sets, where Y is an integer. In this manner, optionally, the user equipment determines, based on the quantity Y of transmission sets that is indicated by the fourth indication information, Z resources that are actually used for channel measurement in the resources available for channel measurement, and performs channel state information measurement and feedback based on the Z resources that are actually used for channel measurement, where Z=k*Y, k is a quantity of resources for channel measurement included in each transmission set, and k is an integer not less than 1. Specifically, performing the channel state information measurement based on the Z resources that are actually used for channel measurement may include: performing channel measurement on the Z resources that are actually used for channel measurement and performing interference measurement on a resource other than the Z resources in the resources available for channel state information measurement.

According to a third aspect, an embodiment of the present invention further provides a channel state information measurement method, including:

receiving, by user equipment, configuration information for channel state information measurement from a radio network device, where the configuration information includes information about resources available for channel state information measurement; and measuring, by the user equipment, channel state information based on the configuration information, and feeding back the channel state information and information about a measurement attribute of a resource that is used for channel state information measurement and that corresponds to the channel state information, where the measurement attribute includes channel measurement, or X types of interference measurement, or channel measurement and X types of interference measurement, and X is an integer not less than 1.

Optionally, the information about the measurement attribute of the resource that is used for channel state information measurement and that corresponds to the channel state information includes several bits, and each of the several bits is used to indicate a measurement attribute of each of resources that are used for channel state information measurement and that correspond to the channel state information.

Optionally, the resources that are used for channel state information measurement and that correspond to the channel state information are some of the resources available for channel state information measurement.

Optionally, the X types of interference measurement include at least one of measuring an interference by using a zero power reference signal, obtaining one or more strongest interferences by using a resource of a non-zero power channel state information reference signal, obtaining one or more weakest interferences by using a resource of a non-zero power channel state information reference signal, obtaining an unprecoded interference by using a resource of a non-zero power channel state information reference signal, obtaining all interferences corresponding to all selectable precoding matrices in an available codebook by using a resource of a non-zero power channel state information reference signal, obtaining a non-strongest or -weakest interference corresponding to a specific precoding matrix by using a resource of a non-zero power channel state information reference signal, and obtaining a precoded interference by using a non-zero power demodulation reference signal.

According to a fourth aspect, user equipment is further provided, including a processor, a memory, and a transceiver.

The memory is configured to store an instruction, the processor is configured to execute the instruction stored in the memory, to control the transceiver to receive and send signals, and when the processor executes the instruction stored in the memory, the user equipment is configured to complete any method related to the user equipment and described in the first aspect or the third aspect.

According to a fifth aspect, a radio network device is further provided, including a processor, a memory, and a transceiver.

The memory is configured to store an instruction, the processor is configured to execute the instruction stored in the memory, to control the transceiver to receive and send signals, and when the processor executes the instruction stored in the memory, the radio network device is configured to complete any method related to the radio network device and described in the second aspect.

According to a sixth aspect, a channel state information measurement apparatus is further provided, including some modules, configured to implement any method related to the foregoing user equipment. Specific modules may correspond to the method steps and are not described herein in detail.

According to a seventh aspect, a channel state information measurement apparatus is further provided, including some modules, configured to implement any method related to the foregoing radio network device. Specific modules may correspond to the method steps and are not described herein in detail.

According to an eighth aspect, a computer storage medium is further provided and configured to store some instructions, and when the instructions are executed, any method related to the foregoing user equipment or radio network device can be completed.

According to a ninth aspect, a communications system is further provided, including the user equipment provided in the fourth aspect and the radio network device provided in the fifth aspect.

The method, apparatus, and system provided in the embodiments of the present invention are intended to meet different requirements for channel state information measurement in different scenarios of coordinated multipoint in a future network.

For ease of understanding, some concepts related to the present invention are illustrated for reference as follows:

The 3rd generation partnership project (3GPP for short) is a project dedicated to the development of wireless communications networks. Generally, an organization related to 3GPP is referred to as a 3GPP organization.

A wireless communications network is a network providing a wireless communication function. The wireless communications network may use different communications technologies, such as code division multiple access (CDMA for short), wideband code division multiple access (WCDMA for short), time division multiple access (TDMA for short), frequency division multiple access (FDMA for short), orthogonal frequency division multiple access (OFDMA for short), single carrier frequency division multiple access (SC-FDMA for short), and carrier sense multiple access with collision avoidance. Based on factors such as a capacity, rate, and latency of different networks, the networks may be divided into a 2G (English: generation) network, a 3G network, a 4G network, or a future evolved network, such as a 5G network. A typical 2G network includes a Global System for Mobile Communications (GSM for short) network or a general packet radio service (GPRS for short) network. A typical 3G network includes a Universal Mobile Telecommunications System (UMTS for short) network. A typical 4G network includes a Long Term Evolution (LTE for short) network. The UMTS network may sometimes also be referred to as a universal terrestrial radio access network (UTRAN for short). The LTE network may sometimes also be referred to as an evolved universal terrestrial radio access network (E-UTRAN for short). Depending on different resource allocation manners, the networks may be divided into a cellular communications network and a wireless local area network (WLAN for short). The cellular communications network is scheduling-based, while the WLAN is contention-based. The foregoing 2G, 3G, 4G, and 5G networks are all cellular communications networks. A person skilled in the art should be aware that with the development of technology, the technical solutions provided in the embodiments of the present invention are equally applicable to another wireless communications network, such as a 4.5G or 5G network, or another non-cellular communications network. For brevity, the wireless communications network is sometimes briefly referred to as a network in the embodiments of the present invention.

The cellular communications network is a type of wireless communications network, which uses a cellular radio networking manner. A terminal device and a network device are connected through a wireless channel, so that users can communicate with each other in motion. A main feature of the cellular communications network is terminal mobility, and the cellular communications network has functions of handover and automatic roaming across a local network.

FDD: Frequency division duplex, frequency division duplex

TDD: Time division duplex, time division duplex

User equipment (UE for short) is a terminal device, which may be a mobile terminal device or an immobile terminal device. The device is mainly configured to receive or send service data. User equipment may be distributed in a network. In different networks, the user equipment has different names, such as a terminal, a mobile station, a subscriber unit, a station, a cellular phone, a personal digital assistant, a wireless modem, a wireless communications device, a handheld device, a laptop computer, a cordless phone, a wireless local loop station, and an in-vehicle terminal. The user equipment may communicate with one or more core networks via a radio access network (RAN for short) (which is an access part of a wireless communications network), for example, exchange voice and/or data with the radio access network.

A base station (BS for short) device, also referred to as a base station, is an apparatus deployed in a radio access network to provide a wireless communication function. For example, devices that provide a base station function in a 2G network include a base transceiver station (BTS for short) and a base station controller (BSC for short); devices that provide a base station function in a 3G network include a NodeB and a radio network controller (RNC for short); devices that provide a base station function in a 4G network include an evolved NodeB (eNB for short); in a WLAN, a device that provides a base station function is an access point (English: access point, AP for short); and devices that provide a base station function in a future 5G network include a next-generation NodeB (gNB), a transmission/reception point (TRP), and a transmission point (TP). The TRP and TP may not include a baseband part, but include only a radio frequency part (including an antenna); or may include a baseband part and a radio frequency part. In some scenarios, a base station may be connected to one or more TRPs or TPs.

A wireless device is a device that is located in a wireless communications network and that can communicate wirelessly. The device may be a base station, user equipment, or another network element.

A network side device is a device on a network side in a wireless communications network, and may be an access network element, such as a base station or a controller (if any), or may be a core network element or another network element.

NR (new radio) refers to a new generation of radio access network technology, and can be applied to a future evolved network, such as a 5G network.

A wireless local area network (WLAN for short) is a local area network using radio waves as a data transmission medium within a typical transmission range of only tens of meters.

An access point (AP for short) connects to a radio network and can also be connected to a device of a wired network. The access point can serve as an intermediate point to allow for mutual connection and data transmission between devices that connect to the Internet in wireless and wired manners.

RRC: Radio resource control

RRC processes layer 3 information of a control plane between UE and a radio access network, and usually includes at least one of the following functions:

Broadcasting information provided by a non-access stratum of a core network: RRC is responsible for broadcasting network system information to UE, where system information is usually repeated according to basic rules, and RRC is responsible for plan execution, segmentation, and repetition. RRC also supports broadcast of upper layer information.

Associating broadcast information with an access stratum: RRC is responsible for broadcasting network system information to UE, where system information is usually repeated according to basic rules, and RRC is responsible for plan execution, segmentation, and repetition.

Establishing, re-establishing, maintaining, and releasing an RRC connection between UE and a radio access network: To establish the first signal connection of the UE, a higher layer of the UE requests to establish an RRC connection. An RRC connection establishment procedure includes several steps: reselection of an available cell, access grant control, and layer 2 signal link setup. RRC connection release is also requested by the higher layer, to remove the last signal connection; or may be initiated by the RRC layer when an RRC link fails. If the connection fails, the UE requests to re-establish an RRC connection. If the RRC connection fails, RRC releases resources that have been allocated.

The functions of RRC may also change as the network evolves. The descriptions herein are not used as a limitation.

This application further describes a channel state information reporting method, apparatus, and system, to provide indication and reporting solutions for reporting of a plurality of pieces of channel state information when user equipment reports the plurality of pieces of channel state information, and minimize a delay in a process of reporting the plurality of pieces of channel state information.

According to a tenth aspect, an embodiment of this application provides a channel state information reporting method, including: receiving, by user equipment, a piece of indication information from a network device, where the indication information is used to indicate reporting of K pieces of channel state information, and the K pieces of channel state information are measured and reported on a same carrier, where K is an integer greater than or equal to 2; and reporting, by the user equipment, the K pieces of channel state information based on the indication information. Triggering reporting of more than one piece of channel state information by using one piece of indication information can reduce a delay in a reporting process of a plurality of pieces of channel state information, so that the network device can receive channel state information required for coordination and scheduling as fast as possible. Optionally, the K pieces of channel state information may be reported at the same time, to further reduce a delay; or may be reported at different times, to adapt to scheduling of uplink resources and alleviate a problem of limited uplink resources.

In a possible design, the K pieces of channel state information are K pieces of aperiodically reported channel state information or K pieces of semi-persistently reported channel state information. Optionally, the indication information includes index information of reporting configurations for the K pieces of channel state information and/or index information of channel state information reporting configuration groups to which the K pieces of channel state information belong. Optionally, the indication information includes information about T channel state information reporting timing offsets, and the T channel state information reporting timing offsets are used for the reporting of the K pieces of channel state information, where T is an integer greater than or equal to 2, and the channel state information reporting timing offset is a time gap between channel state information reporting triggering and channel state information reporting. The time gap may be measured in units of a specific time domain resource unit, for example, measured in slots. For example, if the network device sends channel state information reporting trigger information (for example, the indication information) at a slot 0, and the network device receives a channel state information report at a slot 5, the channel state information reporting timing offset is 4 slots. For another example, if the user equipment receives channel state information reporting trigger information (for example, the indication information) at a slot 0, and the user equipment sends a channel state information report at a slot 5, the channel state information reporting timing offset is 4 slots. Optionally, the indication information may be downlink control information.

In a possible design, the K pieces of channel state information are K pieces of periodically reported channel state information. Optionally, the indication information includes at least one of index information of reporting configurations for the K pieces of channel state information, reporting period information, and reporting subframe offset configuration information. Optionally, the indication information may further include at least one of reporting configuration information for the K pieces of channel state information, and resource information for measuring the K pieces of channel state information. Optionally, the indication information may be RRC signaling.

In a possible design, the indication information further includes beam information, the beam information is used to indicate beams used for reporting the K pieces of channel state information, and the beam information indicates L beams, where L is an integer greater than or equal to 1, and each of the L beams is used for reporting the K pieces of channel state information. Optionally, L is an integer greater than or equal to 2, the L beams are beams sent by using a same time domain resource, or the L beams are beams sent separately by using different time domain resources. Configuring a plurality of beams for the reporting of the K pieces of channel state information can enable the UE to report the K pieces of channel state information to different network devices separately by using different beams, thereby reducing a delay of information exchange between the network devices and further accelerating decision-making on collaboration and scheduling.

According to an eleventh aspect, an embodiment of this application provides a channel state information reporting method, including: sending, by a network device, a piece of indication information to user equipment, where the indication information is used to indicate reporting of K pieces of channel state information, and K is an integer greater than or equal to 2; and receiving, by the network device, the K pieces of channel state information on a same carrier. Optionally, the K pieces of channel state information may be reported at the same time, to further reduce a delay; or may be reported at different times, to adapt to scheduling of uplink resources and alleviate a problem of limited uplink resources.

In a possible design, the K pieces of channel state information are K pieces of aperiodically reported channel state information or K pieces of semi-persistently reported channel state information. Optionally, the indication information includes index information of reporting configurations for the K pieces of channel state information and/or index information of channel state information reporting configuration groups to which the K pieces of channel state information belong. Optionally, the indication information includes information about T channel state information reporting timing offsets, and the T channel state information reporting timing offsets are used for the reporting of the K pieces of channel state information, where T is an integer greater than or equal to 2, and the channel state information reporting timing offset is a time gap between channel state information reporting triggering and channel state information reporting. Optionally, the indication information may be downlink control information.

In a possible design, the K pieces of channel state information are K pieces of periodically reported channel state information. Optionally, the indication information includes at least one of index information of reporting configurations for the K pieces of channel state information, reporting period information, and reporting subframe offset configuration information. Optionally, the indication information may further include at least one of reporting configuration information for the K pieces of channel state information, and resource information for measuring the K pieces of channel state information. Optionally, the indication information may be RRC signaling.

In a possible design, the indication information further includes beam information, the beam information is used to indicate beams used for reporting the K pieces of channel state information, and the beam information indicates L beams, where L is an integer greater than or equal to 1, and each of the L beams is used for reporting the K pieces of channel state information. Optionally, L is an integer greater than or equal to 2, the L beams are beams sent by using a same time domain resource, or the L beams are beams sent separately by using different time domain resources.

According to a twelfth aspect, an embodiment of this application provides user equipment, where the user equipment has a function of implementing a user equipment behavior in the method of the tenth aspect. The function may be implemented by hardware, or may be implemented by hardware executing corresponding software. The hardware or software includes one or more modules corresponding to the foregoing function.

According to a thirteenth aspect, an embodiment of this application provides a network device, where the network device has a function of implementing a network device behavior in the method of the eleventh aspect. The function may be implemented by hardware, or may be implemented by hardware executing corresponding software. The hardware or software includes one or more modules corresponding to the foregoing function.

According to a fourteenth aspect, an embodiment of this application provides user equipment, where a structure of the user equipment includes a transceiver and a processor. The transceiver is configured to support the user equipment in receiving information or data (for example, receiving the indication information) in the method of the tenth aspect and sending information or data (for example, reporting the K pieces of channel state information) in the method of the tenth aspect. The processor is configured to support the user equipment in performing a corresponding function in the method of the tenth aspect, for example, processing the indication information and/or the K pieces of channel state information. In a possible implementation, the structure of the user equipment may further include a memory, where the memory is configured to be coupled to the processor and store a program instruction and data that are necessary for the user equipment.

According to a fifteenth aspect, an embodiment of this application provides a network device, where a structure of the network device includes a transceiver and a processor. The transceiver is configured to support the network device in sending information or an instruction in the method of the eleventh aspect to user equipment and receiving information or data in the method of the eleventh aspect. The processor is configured to support the network device in performing a corresponding function in the method of the eleventh aspect, for example, generating or processing signaling information (for example, the indication information) and/or downlink data in the foregoing method. In a possible implementation, the network device may further include a communications unit, where the communications unit is configured to support the network device in communicating with another network device, for example, receiving information or an instruction sent by a scheduling node or another network device, and/or sending information or an instruction to another network side device. The structure of the network device may further include a memory, where the memory is configured to be coupled to the processor and store a program instruction and data that are necessary for the network device.

According to a sixteenth aspect, an embodiment of this application provides a communications system, and the system includes the user equipment described in the fourteenth aspect and the network device described in the fifteenth aspect.

According to a seventeenth aspect, an embodiment of this application provides a computer storage medium, configured to store a computer software instruction used by the foregoing user equipment, and the computer software instruction includes a program designed to perform the foregoing aspects.

According to an eighteenth aspect, an embodiment of this application provides a computer storage medium, configured to store a computer software instruction used by the foregoing network device, and the computer software instruction includes a program designed to perform the foregoing aspects.

According to a nineteenth aspect, an embodiment of the present invention further provides an apparatus, and the apparatus has a function of implementing the foregoing method in the tenth aspect. The function may be implemented by hardware. A structure of the apparatus includes a memory, a processor, and an instruction that is stored on the memory and that can be executed on the processor, and when the processor runs the instruction, the apparatus implements the method in the tenth aspect. The apparatus may be a chip system, and the chip system includes at least one chip and may further include another discrete device.

According to a twentieth aspect, an embodiment of the present invention further provides an apparatus, and the apparatus has a function of implementing the foregoing method in the eleventh aspect. The function may be implemented by hardware. A structure of the apparatus includes a memory, a processor, and an instruction that is stored on the memory and that can be executed on the processor, and when the processor runs the instruction, the apparatus implements the method in the eleventh aspect. The apparatus may be a chip system, and the chip system includes at least one chip and may further include another discrete device.

According to a twenty-first aspect, an embodiment of the present invention further provides a computer program product, the computer program product includes an instruction, and when the instruction is run on a computer, the computer performs the method in the tenth aspect.

According to a twenty-second aspect, an embodiment of the present invention further provides a computer program product, the computer program product includes an instruction, and when the instruction is run on a computer, the computer performs the method in the eleventh aspect.

DESCRIPTION OF EMBODIMENTS

Figure 1:
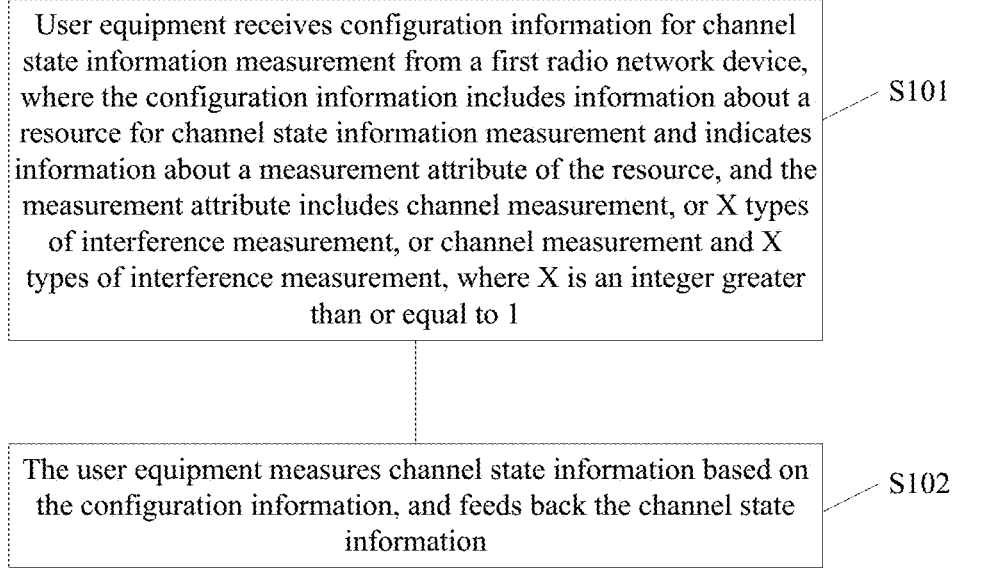
FIG. 1 is a schematic flowchart of a channel state information measurement method according to an embodiment of the present invention.

The following describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Terms such as "component", "module", and "system" used in this application are used to indicate computer-related entities. The computer-related entities may be hardware, firmware, combinations of hardware and software, software, or running software. For example, a component may be, but is not limited to, a process that runs on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and based on, for example, a signal having one or more data packets (for example, data from one component, where the component interacts with another component in a local system or a distributed system, and/or interacts with other systems via a network such as the Internet by using a signal).

In addition, various aspects of this application are described with reference to a wireless device, where the wireless device may be a radio network device, or may be a terminal device. The radio network device may be a base station, and the base station may be configured to communicate with one or more user equipments, or may be configured to communicate with one or more base stations having some user equipment functions (for example, communication between a macro base station and a micro base station, such as an access point). Alternatively, the wireless device may be user equipment, and the user equipment may be configured to communicate with one or more user equipments (for example, D2D communications), or may be configured to communicate with one or more base stations. The user equipment may also be referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless phone, a Session Initiation Protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device that performs communication on a wireless system. The base station may also be referred to as an access point, a node, a NodeB, an evolved NodeB (eNB), a gNB, a TRP, a TP, or another network entity, and may include some or all functions of the foregoing network entities. The base station may communicate with a wireless terminal through an air interface. The communication may be performed within one or more sectors. The base station may serve as a router between the wireless terminal and other parts of an access network by converting a received air interface frame into an IP packet, where the access network includes an Internet Protocol (IP) network. The base station may further coordinate management of air interface attributes, and may further be a gateway between a wired network and a radio network.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of the present invention is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of the present invention, information, signal, message, or channel may be used interchangeably sometimes. It should be noted that expressed meanings are consistent when differences are not emphasized. "Of", "corresponding", and "corresponding" may be used interchangeably. It should be noted that expressed meanings are consistent when differences are not emphasized.

In the embodiments of the present invention, a subscript form such as $W_1$ may sometimes be written as a non-subscript form such as W1 by mistake, and expressed meanings are consistent when differences are not emphasized.

A network architecture and a service scenario that are described in the embodiments of the present invention are intended to more clearly describe the technical solutions in the embodiments of the present invention, and do not constitute a limitation on the technical solutions provided in the embodiments of the present invention. A person of ordinary skill in the art may know that, as the network architecture evolves and a new service scenario appears, the technical solutions provided in the embodiments of the present invention are also applicable to a similar technical problem.

The embodiments of the present invention may be applied to a time division duplex (TDD) scenario, and may also be applicable to a frequency division duplex (FDD) scenario.

The embodiments of the present invention may be applied to a legacy typical network, and may also be applied to a future UE-centric network. A non-cell network architecture is introduced into the UE-centric network. To be specific, a large quantity of small cells are deployed within a specific area to form a hyper cell. Each small cell is a transmission point (TP) or TRP of the hyper cell, and is connected to a centralized controller. When UE moves within the hyper cell, a network side device selects a new sub-cluster for the UE in real time to serve the UE, thereby avoiding a true cell handover and achieving continuity of a UE service. The network side device includes a radio network device.

Optionally, in the embodiments of the present invention, the base station is uniquely identified by a base station ID. If all TPs or TRPs in a hyper cell have a same ID, there is only one base station in the hyper cell.

As described in background, the protocol 3GPP TS36.213 proposes using an NZP CSI-RS for channel measurement and using a ZP CSI-RS for interference measurement.

A type of RRC signaling given in 3GPP TS 36.331 vd.0.0 is configured as follows:

```
CSI process
CSI-Process information elements-- ASN1START
CSI-Process-r11 ::=                    SEQUENCE {
    csi-ProcessId-r11                      CSI-ProcessId-r11,
    csi-RS-ConfigNZPId-r11                 CSI-RS-ConfigNZPId-r11,
    csi-IM-ConfigId-r11                    CSI-IM-ConfigId-r11,
    p-C-AndCBSRList-r11                    SEQUENCE (SIZE (1..2)) OF P-C-AndCBSR-r11,
    cqi-ReportBothProc-r11                 CQI-ReportBothProc-r11            OPTIONAL,
-- Need OR
    cqi-ReportPeriodicProcId-r11           INTEGER       (0..maxCQI-ProcExt-r11)
OPTIONAL,-- Need OR
    cqi-ReportAperiodicProc-r11            CQI-ReportAperiodicProc-r11       OPTIONAL,
-- Need OR
    ...,
    [[  alternativeCodebookEnabledFor4TXProc-r12  ENUMERATED       {true}
OPTIONAL,-- Need ON
        csi-IM-ConfigIdList-r12            CHOICE {
            release                            NULL,
            setup                              SEQUENCE     (SIZE     (1..2))     OF
CSI-IM-ConfigId-r12
        }                                                           OPTIONAL,--
Need ON
        cqi-ReportAperiodicProc2-r12       CHOICE {
            release                            NULL,
            setup                              CQI-ReportAperiodicProc-r11
        }                                                           OPTIONAL --
Need ON
    ]],
    ...
}
P-C-AndCBSR-PerResourceConfig-r13 ::=  SEQUENCE   (SIZE   (1..2))                   OF
P-C-AndCBSR-r13
-- ASN1STOP
``` csi-ProcessId represents an identifier (identity or identifier, ID) of a CSI process, csi-RS-ConfigNZPId represents an identifier (ID) of an NZP CSI-RS, and csi-IM-ConfigId represents an ID of a CSI-RS used for interference measurement (interference measurement, IM). The CSI-RS used for interference measurement (interference measurement, IM) includes a ZP CSI-RS.

Information elements included in an NZP CSI-RS field are as follows:

```
CSI-RS-ConfigNZP information elements
-- ASN1START
CSI-RS-ConfigNZP-r11 ::=    SEQUENCE {
    csi-RS-ConfigNZPId-r11              CSI-RS-ConfigNZPId-r11,
    antennaPortsCount-r11               ENUMERATED {an1, an2, an4, an8},
    resourceConfig-r11                  INTEGER (0..31),
    subframeConfig-r11                  INTEGER (0..154),
    scramblingIdentity-r11              INTEGER (0..503),
    qcl-CRS-Info-r11                    SEQUENCE {
        qcl-ScramblingIdentity-r11          INTEGER (0..503),
        crs-PortsCount-r11                  ENUMERATED {n1, n2, n4, spare1},
        mbsfn-SubframeConfigList-r11        CHOICE {
            release                             NULL,
            setup                               SEQUENCE {
```

|  |  |
| --- | --- |
| subframeConfigList | MBSFN-SubframeConfigList |
|   } |   |
|  } |  |
| OPTIONAL -- Need ON |  |
|     } |  |
| OPTIONAL,-- Need OR |  |
|     ... |  |
|  } |  |
|   ResourceConfig-r13 ::= | INTEGER (0..31) |
| -- ASN1STOP |  | csi-RS-ConfigNZPId represents an ID of the NZP CSI-RS, antennaPortsCount represents a quantity of antenna ports, resourceConfig represents resource configuration information (such as time-frequency resource configuration information, which may also be referred to as a transmission pattern pattern), subframeConfig represents subframe configuration information, scramblingIdentity represents scrambling information, and qcl-CRS-Info represents information about a CRS common reference signal) in a QCL (quasi-co-located) relationship with the CSI-RS.

Information elements included in a ZP CSI-RS field are as follows:

```
CSI-RS-ConfigZP information elements
-- ASN1START
CSI-RS-ConfigZP-r11 ::=           SEQUENCE {
    csi-RS-ConfigZPId-r11         CSI-RS-ConfigZPId-r11,
    resourceConfigList-r11        BIT STRING (SIZE (16)),
    subframeConfig-r11            INTEGER (0..154),
    ...
}
-- ASN1STOP
``` csi-RS-ConfigZPId represents an ID of the ZP CSI-RS, resourceConfigList represents a resource configuration table (each resource configuration corresponds to one transmission pattern), and subframeConfig represents subframe configuration information.

The current protocol does not support channel measurement using a non-NZP CSI-RS (namely, channel measurement), or support interference measurement using a non-ZP CSI-RS (namely, interference measurement).

Therefore, only a sum of powers of all interferences on ZP CSI-RS resources can be measured by using the ZP CSI-RS, but there is no way to perform purposeful measurement, for example, measuring H*Wmax (where H is a channel matrix, and Wmax is a precoding matrix with a highest throughput rate) corresponding to a strongest interference, or measuring H*Wmin (where Wmin is a precoding matrix with a lowest throughput rate) corresponding to a weakest interference, or measuring H corresponding to an omnidirectional interference.

In the embodiments of the present invention, measurement of channel state information (which may also be referred to as obtaining of channel state information) may be implemented based on a signal to interference plus noise ratio (SINR) (for example, a CQI may be obtained based on a table of a correspondence between a CQI and a SINR), and the SINR may be obtained based on a signal power and an interference power. The signal power may be obtained through channel measurement (briefly referred to as a channel measurement power), and the interference power may be obtained through interference measurement (briefly referred to as an interference measurement power). Specifically, SINR=Channel measurement power/(Interference measurement power+Noise power). Both the channel measurement power and the power of interference measurement performed based on a non-zero power reference signal can be obtained based on an H*W vector value, for example, a square of a value of ∥H*W∥, where ∥H*W∥ means a determinant of a product of H and W. H is a channel measurement vector, which is a channel impulse response obtained through operations such as correlation and interpolation based on a pilot signal. W is a precoding vector, which is selected by UE from an available codebook, and is usually obtained based on a throughput rate. If a throughput rate of H*W1 is the largest, the UE reports a PMI corresponding to W1 to a base station. During scheduling, the base station refers to the PMI reported by the UE. Other user equipments within a cell need to be considered during scheduling by the base station, and user equipment in a neighboring cell also needs to be considered during coordination. Therefore, reporting of the UE is only for reference of the base station. Despite a precoding matrix that the UE considers to be the best, the base station does not necessarily encode data based on the PMI when delivering the data. To enable the base station to have more sufficient information to obtain a better scheduling result, a measurement result reported by the UE needs to be as sufficient as possible. For example, in a coordination scenario, the UE needs to report CSI of the neighboring cell measured by the UE. The CSI is an interference to transmission from the serving base station to the UE, and the measurement result reported by the UE can facilitate the scheduling by the serving base station. For example, the interference is the strongest when the neighboring cell uses W1, and is the weakest when the neighboring cell uses W2, and W3, W4, and W5 are other selectable precoding matrices. Assuming that the UE reports CSI corresponding to all possible precoding matrices W, the serving base station can learn that the neighboring cell needs to avoid W1 and try the best to select W2. If W2 cannot be selected, W3 may be selected because a vector distance from W3 to W2 is shorter than that from W3 to W1. In conclusion, more CSI reported by the UE to the base station makes it more likely for the serving base station and a coordinated base station to obtain an optimal scheduling result.

In the embodiments of the present invention, a resource for channel measurement indicates that a power measured on the resource and obtained based on H*W is used as a channel measurement power (briefly referred to as a channel), and a resource for interference measurement indicates that a power measured on the resource and obtained based on H*W is used as an interference measurement power (briefly referred to as an interference). In this way, the CSI fed back based on the resource for channel measurement can be obtained based on the channel measurement power and the interference measurement power.

The CSI may include one or a combination of more of a channel quality indicator (CQI), a rank indicator (RI), and precoding matrix indicator (PMI) information. In the embodiments of the present invention, a CQI is used as an example in some descriptions, but it does not mean that these descriptions are only applicable to the CQI, and it should be understood that these descriptions are applicable to RI and PMI feedback.

In view of this, as shown in FIG. 1, an embodiment of the present invention provides a channel state information measurement method, including the following steps:

S101. User equipment receives configuration information for channel state information measurement from a first radio network device, where the configuration information includes information about a resource for channel state information measurement and indicates information about a measurement attribute of the resource, and the measurement attribute includes channel measurement, or X types of interference measurement, or channel measurement and X types of interference measurement, where X is an integer greater than or equal to 1.

S102. The user equipment measures channel state information based on the configuration information, and feeds back the channel state information.

The user equipment feeds back the channel state information to a second radio network device, where the second radio network device and the first radio network device may be the same or different.

Correspondingly, the first radio network device sends the configuration information for channel state information measurement to the user equipment, where the configuration information includes the information about the resource for channel state information measurement and indicates the information about a measurement attribute of the resource, and the measurement attribute includes channel measurement, or X types of interference measurement, or channel measurement and X types of interference measurement, where X is an integer greater than or equal to 1.

The second radio network device receives the channel state information from the user equipment, where the channel state information is obtained based on the configuration information, and the second radio network device and the first radio network device are the same or different.

Optionally, the first radio network device is a radio network device to which a serving cell of the user equipment belongs, and the second radio network device is the radio network device to which the serving cell of the user equipment belongs or a radio network device to which a non-serving cell belongs.

Optionally, that the configuration information indicates information about a measurement attribute of the resource includes:

the configuration information includes first indication information used to indicate the measurement attributes; or a resource or format of the configuration information is used to indicate the measurement attribute of the resource.

Optionally, the X types of interference measurement include at least one of measuring an interference (for example, an interference power) by using a zero power reference signal, obtaining P strongest interferences (where P is configurable or is predefined in a protocol without needing to be configured) by using a resource of a non-zero power channel state information reference signal, obtaining Q weakest interferences (where Q is configurable or is predefined in a protocol without needing to be configured) by using a resource of a non-zero power channel state information reference signal, obtaining an unprecoded interference (omnidirectional interference) by using a resource of a non-zero power channel state information reference signal, obtaining all interferences corresponding to all selectable precoding matrices in an available codebook by using a resource of a non-zero power channel state information reference signal, obtaining a non-strongest or -weakest interference corresponding to a specific precoding matrix (W) by using a resource of a non-zero power channel state information reference signal, obtaining an interference by using a non-zero power demodulation reference signal, and obtaining a precoded interference by using a non-zero power demodulation reference signal.

Optionally, a UE measurement behavior that may correspond to "obtaining a non-strongest or -weakest interference corresponding to a specific precoding matrix (W) by using a resource of a non-zero power channel state information reference signal" may include: The UE estimates a channel signal based on the NZP CSI-RS, and the UE subtracts the channel signal from a received signal, where a remaining signal is considered as an interference signal, and the interference signal may be the non-strongest or -weakest interference corresponding to the specific precoding matrix (W).

Optionally, a UE measurement behavior corresponding to "obtaining a precoded interference by using a non-zero power demodulation reference signal" may include: The UE measures, based on the DMRS, an interference caused by another UE, where the another UE includes paired UEs in an MU-MIMO (multi-user multiple-input multiple-output) scenario, and/or UE scheduled by another cell different from a cell in which the UE is located, and the interference may be a precoded interference.

Optionally, as described above, the X types of interference measurement may further include obtaining the interference by using the non-zero power demodulation reference signal. In this case, a corresponding UE measurement behavior may be: The UE estimates a channel signal based on the DMRS, and the UE subtracts the channel signal from a received signal, where a remaining signal is considered as an interference signal, and the interference may be precoded or may be unprecoded.

It may be understood that a UE measurement behavior that may correspond to "obtaining a precoded interference by using a non-zero power demodulation reference signal" when an interference of a neighboring cell is precoded is: The UE estimates a channel signal based on the DMRS, and the UE subtracts the channel signal from a received signal, where a remaining signal is considered as an interference signal, and the interference may be precoded.

The foregoing P strongest interferences or Q weakest interferences may be obtained when the base station delivers a class A CSI-RS. In this case, the CSI-RS is unprecoded and is an omnidirectional signal. After receiving the CSI-RS, the UE selects, through traversing, P best precoding matrices or Q worst precoding matrices, and reports corresponding PMIs. Alternatively, the foregoing P strongest interferences or Q weakest interferences may be obtained when the base station delivers a class B CSI-RS, where the CSI-RS may be precoded by using W1, and W1 is a wide beam. After receiving the CSI-RS, the UE traverses selectable precoding matrices W2 to select P best precoding matrices W2 or Q worst precoding matrices W2, and reports corresponding PMIs.

Therefore, the CSI-RS delivered by the base station in practice may be precoded or may be unprecoded.

Figure 2:
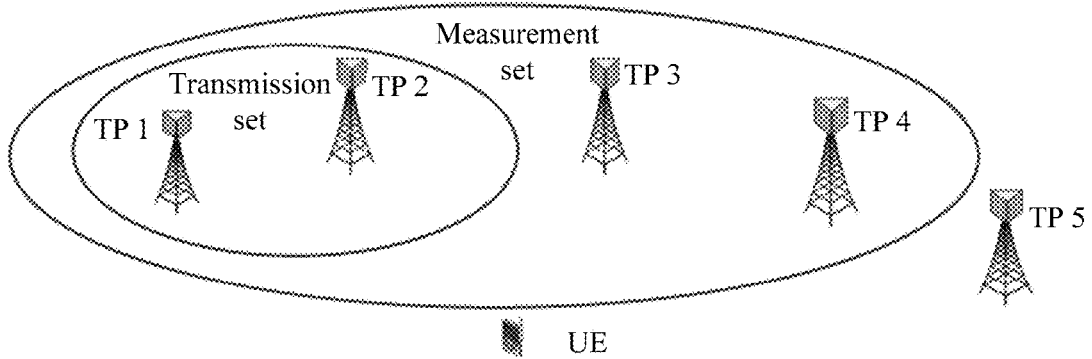
FIG. 2 is a schematic diagram of a multi-cell coordination scenario according to an embodiment of the present invention.

A main scenario of this embodiment of the present invention is based on coordinated transmission. In this embodiment, CSI measurement and feedback processes are enhanced, and a plurality of measurement resources and measurement behaviors are indicated. FIG. 2 is a schematic diagram of a multi-cell coordination scenario.

In the coordination scenario shown in FIG. 2, when a transmission set is not determined, CSI measurement needs to help decide which TPs participate in transmission. Therefore, a hypothetical transmission set and a hypothetical interference combination are required, so that the UE can provide CSI measurement results under different hypotheses. The TPs decide, based on different CSI measurement results, which TPs are included in the transmission set. It may be understood that the TP in this scenario may also be a TRP or a gNB, and both may be referred to as a base station.

According to FIG. 2, an existing transmission set is {TP 1, TP 2}, but as the UE moves, it is not sure whether a TP 3 is to be added to the transmission set. In this case, a hypothetical transmission set may be {TP 1, TP 2}, or {TP 2, TP 3}, or {TP 1, TP 2, TP 3}. If the transmission set is not determined, it is not sure whether a resource allocated to each TP is used for channel measurement or interference measurement. With the development of NR, a reference signal RS can be used for both channel measurement and interference measurement, and therefore a measurement purpose cannot be determined by using a resource type (a non-zero power or a zero power). In addition, if the transmission set is not determined, the measurement purpose cannot be bound with a resource ID. Therefore, under a transmission set hypothesis, the measurement resource and the measurement behavior may be bound, and the measurement resource and the measurement behavior may be indicated. The indication herein includes an explicit indication, for example, includes the first indication information; or may include an implicit indication. For example, the measurement behavior is indicated by using a resource or a format of configuration information for indicating the measurement resource, or is implicitly indicated by using other information in a correspondence with the measurement behavior.

A possible manner of defining the measurement resource and the measurement behavior is as follows:

| Possible resource type | Physical meaning | UE measurement behavior |
| --- | --- | --- |
| NZP | Measure a channel | H * Wmax |
| NZP | Strongest precoded interference | H * Wmax |
| NZP | No precoding matrix (omnidirectional interference) | H |
| NZP | Weakest precoded interference | H * Wmin |
| ZP | Measure an interference power | power |
| DMRS | Precoded interference | |

When the foregoing indication is an explicit indication, correspondences between the following measurement resources and measurement behaviors may be numbered, as shown in Table 1.

TABLE 1

| Type # | Possible resource type | Physical meaning | UE measurement behavior |
| --- | --- | --- | --- |
| 0 | NZP | Measure a channel | H * Wmax |
| 1 | NZP | Strongest precoded interference | H * Wmax |
| 2 | NZP | No precoding matrix (omnidirectional interference) | H |
| 3 | NZP | Weakest precoded interference | H * Wmin |

TABLE 1-continued

| Type # | Possible resource type | Physical meaning | UE measurement behavior |
| --- | --- | --- | --- |
| 4 | ZP | Measure an interference power | Power |
| 5 | DMRS | Precoded interference | |

In this way, when receiving the first indication information, the UE can determine a measurement behavior to be performed, and report corresponding channel state information.

For example, a possible implementation is as follows:

The base station delivers Type #, and the UE learns how to measure an interference on a resource. For example:

Type #0: A result measured on an NZP CSI-RS resource is used as a channel measurement result and is for counting a CQI.

Type #1: An H matrix is first measured on an NZP CSI-RS resource based on pilot correlation, and the UE sequentially determines throughput rates corresponding to H*W based on a codebook corresponding to a rank or a precoding matrix group configured by the base station, where a W matrix corresponding to a highest throughput rate is a W matrix that causes a strongest interference. Alternatively, H*W1 (class B wide beam) is measured based on a pilot correlation by using a CSI-RS, and then the UE selects W2 in a polling manner, where H*W1*W2 is interference information and may be used as an interference in CQI calculation. Likewise, for Type #3, a W matrix corresponding to a smallest throughput rate may be selected based on an indicator, namely, a throughput rate, and the matrix is a precoded matrix that causes a weakest interference.

Type #2: A signal sent by a neighboring base station is an omnidirectional signal, that is, is not precoded. In this case, the serving base station may send the information to the UE, and the UE may measure only the H matrix on the NZP CSI-RS. UE measurement behaviors corresponding to Type #3 and Type #0 are the same, but in CQI calculation, one measurement result is used as a channel, while the other is used as an interference.

Type #4 is an existing interference measurement technology: Interferences caused by all base stations except the serving base station are measured on a ZP CSI-RS. The prior art supports only measurement of interference power on the ZP CSI-RS.

For Type #5, an interference is measured on a DMRS resource, and the interference measured on the DMRS is precoded. Possible solutions for interference measurement using a DMRS are as follows:

(1) If a precoding matrix used on the DMRS is consistent with a precoding matrix of data, a final result of H*W is measured on the DMRS.

(2) If the precoding matrix used on the DMRS is inconsistent with a precoding matrix of data, a possible solution is: The base station notifies the UE of a precoding matrix used on the DMRS; and after an H matrix is obtained by multiplying a result measured on the DMRS by an inverse matrix of W, the UE selects a W matrix corresponding to a strongest or weakest interference based on an indicator (for example, the foregoing throughput rate); or the serving base station notifies the UE of W used for data that is sent together with the DMRS, and the UE multiplies the H obtained through inverse multiplication by the notified W used for the data, to obtain an interference caused by the data.

(3) If a precoding matrix on the DMRS is inconsistent with a precoding matrix of data, another possible case is: The DMRS is precoded by using a wide beam W1, and the data is encoded by using the wide beam W1 multiplied by a narrow beam W2. In this case, the UE may select the narrow beam W2 based on an indicator (for example, a throughput rate or another indicator: a SINR, a CQI, or the like), and therefore an interference caused by the data may be obtained by multiplying H*W1 (measurement result measured on a DMRS pilot) by W2.

It may be understood that a reference signal other than those listed in the table above, for example, an SRS may also be used for interference measurement. (DMRS hw1w2)

When the foregoing indication is an implicit indication, the indication may be performed by using a field in which the resource for channel state information measurement is located (namely, the format of the configuration information), or the implicit indication may be performed by using other information in a correspondence with the measurement behavior.

Optionally, the other information in the correspondence with the measurement behavior may include:

(1) Transmission Mode

The UE may determine a measurement behavior on a configured or triggered interference measurement resource based on a correspondence between a transmission mode and a measurement behavior. For example, when the transmission mode is a coordinated transmission mode (TM 10), on the configured or triggered NZP CSI-RS resource, the UE obtains an interference by multiplying a channel matrix measured on the NZP CSI-RS resource by a precoding matrix. For example, when the transmission mode is a multi-user mode (such as MU or TM 5), on the configured or triggered NZP CSI-RS resource, the UE subtracts an estimated channel signal from a received signal, and a remaining signal is used as an interference. For another example, when the transmission mode is a multi-user mode (MU or TM 5), on the configured or triggered NZP CSI-RS resource, the UE measures, by using the DMRS resource, an interference caused by another UE. Optionally, the another UE includes paired UEs in an MU-MIMO scenario, and/or UE scheduled by another cell different from a cell in which the UE is located. For another example, when the transmission mode is multi-stream beamforming transmission (TM 9), on the configured or triggered DMRS resource, the UE may subtract a channel signal estimated by using the DMRS from a received signal, and a remaining signal is used as an interference. Which specific correspondence is used may be set by a system or configured on a network side. Optionally, other reference factors may also be introduced during setting or configuration. This is not limited herein.

(2) Other Configuration Information, for Example, a Quantity of Downlink Control Channels that are Used for Downlink Data Transmission on a Current Carrier and that Need to be Simultaneously Detected by the UE, and/or QCL Configuration Information The UE may determine a measurement behavior on a configured or triggered interference measurement resource based on a correspondence between other configuration information and a measurement behavior. The other configuration information includes, for example, the quantity of downlink control channels that are used for the downlink data transmission on the current carrier and that need to be simultaneously detected by the UE, and/or the QCL configuration information.

For example, there is a correspondence between the quantity of the downlink control channels that are used for the downlink data transmission on the current carrier and that need to be simultaneously detected by the UE and the measurement behavior of the UE. For example, the base station configures a quantity of PDCCHs that need to be received by the UE. When the quantity is greater than 1, on the configured or triggered NZP CSI-RS resource, the UE obtains an interference by multiplying a channel matrix measured on the NZP resource by a precoding matrix; or the UE subtracts an estimated channel signal from a received signal, and a remaining signal is used as an interference; or the UE measures, by using the DMRS resource, an interference caused by another UE; or the UE subtracts a channel signal estimated by using the DMRS from a received signal, and a remaining signal is used as an interference. Optionally, the another UE includes paired UEs in an MU-MIMO scenario, and/or UE scheduled by another cell different from a cell in which the UE is located. Which specific correspondence is used may be set by a system or configured on a network side. Optionally, other reference factors may also be introduced during setting or configuration. This is not limited herein.

For another example, the other configuration information may also be the QCL configuration information. For example, the measurement behavior may be determined by using a PQI (PDSCH RE Mapping and Quasi-Co-Location Indicator, PDSCH RE mapping and quasi-co-location indicator) field. For example, when the PQI indicates at least two pieces of QCL information, on the configured or triggered NZP CSI-RS resource, the UE obtains an interference by multiplying a channel matrix measured on the NZP resource by a precoding matrix; or the UE subtracts an estimated channel signal from a received signal, and a remaining signal is used as an interference; or the UE measures, by using the DMRS resource, an interference caused by another UE; or the UE subtracts a channel signal estimated by using the DMRS from a received signal, and a remaining signal is used as an interference. Optionally, the another UE includes paired UEs in an MU-MIMO scenario, and/or UE scheduled by another cell different from a cell in which the UE is located. Which specific correspondence is used may be set by a system or configured on a network side. Optionally, other reference factors may also be introduced during setting or configuration. This is not limited herein.

It may be understood that the foregoing indication may also be a combination of an explicit indication and an implicit indication, for example, channel measurement is implicitly indicated, and specific types of interference measurement are explicitly indicated.

A same type of RS can be used for both channel measurement and interference measurement, or a plurality of types of RSs are used for channel measurement or interference measurement. The following case may occur: The base station configures the measurement resource for the UE, but according to the existing protocol, the UE does not know whether a result measured on the configured resource is a channel or an interference, or whether a result measured on the configured resource is a strongest interference or a weakest interference. Therefore, configuration of a type of resource no longer represents a single measurement behavior. Based on the method provided in this embodiment of the present invention, a measurement behavior corresponding to a type of resource may be configured.

In addition, in the coordination scenario, the transmission set dynamically changes with movement of the UE or dynamic coordination between the base stations. Therefore, in a measurement phase, neither the base station nor the UE has determined which base stations are included in the transmission set (unless determining of the transmission set depends on an RSRP), and the CSI measurement results need to assist the base station in deciding a size and composition of the transmission set. A possible solution is that the UE feeds back CSI measurement results corresponding to possible transmission sets to the base station, to provide the base station with measurement results under various coordination hypotheses, transmission hypotheses, and interference hypotheses, thereby helping the base station make a decision. According to the method provided in this embodiment of the present invention, the UE can obtain a plurality of CSI measurement results based on measurement attributes, to support the base station in making the decision.

The following provides several possible configuration manners:

Manner 1: There is at least one resource for channel state information measurement, the first indication information used to indicate the measurement attribute of the resource includes several elements, and each of the several elements is used to indicate a measurement attribute of each of the resources. Each element may be an int (decimal) value, a bit value, or an index of the measurement attribute. In this manner, optionally, each resource has only one measurement attribute. A quantity of bits of the bit value of each element is related to a quantity of types of measurement attributes. For example, if the quantity of types of the measurement attributes is 4, the quantity of bits of the bit value is 2; or if the quantity of types of the measurement attributes is 5, the quantity of bits of the bit value is 3. In this manner, optionally, the first indication information may be included in a channel state information measurement setting (CSI measurement setting) field or a CSI process field. Optionally, the first indication information is included in higher layer signaling, or is included in physical layer signaling. The higher layer signaling may include RRC signaling, and the physical layer signaling may include downlink control information (DCI) signaling. In this case, when a measurement attribute of a resource changes, a TRP needs to reconfigure and deliver the first indication information. It may be understood that this case is not only applicable to a case in which a plurality of types of interference measurement exist, as defined above, but also applicable to a case in which only channel measurement and one type of interference measurement (for example, existing interference measurement using a ZP CSI-RS) exist. For example, the measurement attributes of the resources that are configured by the base station are shown below in Table 2:

TABLE 2

| Type (Measurement attribute) | Resource IDs (Resource identifiers) |
|---|---|
| 0 or 00 | 1, 2 |
| 1 or 01 | 3, 4, 5 |
| 2 or 10 | 6, 7 |

The first indication information may be 0011122, where each element is 1 int; or may be 00000101011010, where each element has 2 bits. Corresponding IDs are in ascending order in both cases.

After receiving the first indication information, the UE can learn that measurement attributes of resources whose IDs are 1 and 2 are 0, measurement attributes of resources whose IDs are 3, 4, and 5 are 1, and measurement attributes of resources whose IDs are 6 and 7 are 2.

Manner 2: Because information about a measurement attribute of a resource is decoupled from a resource type, it may be configured that a same resource is used for both channel measurement and at least one of the foregoing X types of interference measurement. In other words, the resources for channel state information measurement have one measurement attribute, or have more than one measurement attribute. The first indication information used to indicate the information about the measurement attribute of the resource may be configured in the dimension of an identifier (ID) of the resource. For example, the first indication information is included in a resource field of the resource. For example, the first indication information may have several elements, and each element may be an index of a measurement attribute of the resource, or each of the several elements corresponds to one measurement attribute. A quantity of elements is related to a type of the measurement attribute. For example, when an element is "1", it indicates that a measurement attribute corresponding to the element is activated; or when an element is "0", it indicates that a measurement attribute corresponding to the element is not activated. For example, the base station configures a measurement attribute for each resource (ID), as shown below in Table 3:

TABLE 3

| Resource ID | Resource | Type Measurement attribute | Physical meaning | UE measurement behavior |
|---|---|---|---|---|
| 0 | NZP | 0 | Measure a channel | H*Wmax |
| 1 | NZP | 1 | Strongest precoded interference | H*Wmax |
| 2 | NZP | 2 | No precoding matrix (omnidirectional interference) | H |
| 3 | NZP | 2 | No precoding matrix (omnidirectional interference) | H |
| 4 | ZP | 4 | Measure an interference power | Power |

Resource configuration information may be exemplified as follows:

```
CSI-RS-ConfigNZP information elements (CSI-RS-ConfigNZP information
elements)
-- ASN1START
CSI-RS-ConfigNZP-r11 ::=      SEQUENCE {
    csi-RS-ConfigNZPId-r1             CSI-RS-ConfigNZPId-r11,
    MeasureType                        INTEGER (0..4),
    antennaPortsCount-r11             ENUMERATED {an1, an2, an4, an8},
    resourceConfig-r11                INTEGER (0..31),
    subframeConfig-r11                INTEGER (0..154),
    scramblingIdentity-r11            INTEGER (0..503),
    qcl-CRS-Info-r11                  SEQUENCE {
```

-continued

```
    qcl-ScramblingIdentity-r11        INTEGER (0..503),
    crs-PortsCount-r11                ENUMERATED {n1, n2, n4, spare1},
    mbsfn-SubframeConfigList-r11      CHOICE {
      release                           NULL,
      setup                             SEQUENCE {
        subframeConfigList                MBSFN-SubframeConfigList
      }
    }                                 OPTIONAL --    Need ON
  }                                   OPTIONAL,--    Need OR
```

Measure Type is used to indicate a measurement attribute of the resource.

According to corresponding configurations in the foregoing table, the UE can learn that channel measurement is performed on a resource whose resource ID is 0, interference measurement is performed on a resource whose ID is 1 to obtain a strongest interference, interference measurement is performed on resources whose IDs are 2 and 3 to obtain an omnidirectional interference, and interference measurement is performed on a resource whose ID is 4 to obtain an interference power of a neighboring base station.

It may be understood that the foregoing table shows a case in which each ID has only one measurement attribute, but this embodiment may be applied to a case in which each ID has more than one measurement attribute.

Manner 3: In Manner 2, configuration is performed in the dimension of a resource, while in another manner, configuration may be performed in the dimension of a measurement attribute. To be specific, one measurement attribute corresponds to one resource for channel state information measurement, or one measurement attribute corresponds to more than one resource for channel state information measurement. During configuration, the first indication information used to indicate the information about the measurement attribute of the resource may include several elements, and each element may be a resource identifier of one or more than one resource that is used for channel state information measurement and that has a specific measurement attribute; or each of the several elements corresponds to one resource identifier, indicating whether the resource has the measurement attribute. A quantity of elements is related to a total quantity of resources (identifiers). For example, when an element is "1", it indicates that a resource corresponding to the element has the measurement attribute; or when an element is "0", it indicates that a resource corresponding to the element does not have the measurement attribute. For example, the base station configures a resource ID for each measurement attribute, as shown below in Table 4:

TABLE 4

| Type | Physical meaning | UE measurement behavior | Resource IDs |
|---|---|---|---|
| 0 | Measure a channel | H*Wmax | 0 |
| 1 | Strongest precoded interference | H*Wmax | 1 |
| 2 | No precoding matrix (omnidirectional interference) | H | 2, 3 |
| 3 | No precoding matrix (omnidirectional interference) | H | |
| 4 | Measure an interference power | Power | 4 |

A type of measurement attribute configuration signaling is exemplified as follows:

```
MeasureType0 ::=           SEQUENCE {
  CSI-RS-ConfigIdList        SEQUENCE  (SIZE(1..5) )  OF
CSI-RS-ConfigId-r11
}
MeasureType1 ::=           SEQUENCE {
  CSI-RS-ConfigIdList        SEQUENCE(SIZE(1..5))  OF  CSI-RS-
ConfigId-r11
}
```

MeasureType0 configures a CSI-RS resource ID corresponding to Type 0 (which is configured by using CSI-RS-ConfigIdList), and MeasureType1 configures a CSI-RS resource ID corresponding to Type 1 (which is configured by using CSI-RS-ConfigIdList).

Optionally, the configuration signaling may be included in a CSI measurement setting field or a CSI process field.

According to corresponding configurations in the foregoing table, the UE can learn that a resource whose ID is 0 is used for channel measurement, a resource whose ID is 1 is used for interference measurement of Type 1, resources whose IDs are 2 and 3 are used for interference measurement of Type 2, and a resource whose ID is 4 is used for interference measurement of Type 4.

It may be understood that the foregoing table shows a case in which each ID has only one measurement attribute, but this embodiment may be applied to a case in which each ID has more than one measurement attribute.

In such a manner, the type may also be RS setting and IM setting included in the CSI measurement setting field. The foregoing table may be expressed in Table 5 as follows:

TABLE 5

| Type Measurement type (Attribute) | Resource IDs Resource identifiers |
|---|---|
| RS-setting | 1, 2 |
| IM-setting | 3, 4, 5 |

In this way, a resource ID corresponding to each measurement attribute may be configured in a corresponding measurement attribute field. For example, resource IDs of 1 and 2 are configured in an RS-setting (reference signal setting) field, and resource IDs of 3, 4, and 5 are configured in an IM-setting (interference measurement setting) field.

Optionally, in a link configured in the CSI measurement setting field, configuration information of the link may be used to indicate a measurement attribute of a resource in resource setting indicated by the link.

The resource in the resource setting is the foregoing resource for channel state information measurement.

The configuration information of the link may include: a resource setting identifier (resource setting ID) and a reporting setting identifier (reporting setting ID). The information about the foregoing resource for channel state information measurement includes the resource setting identifier.

Optionally, the configuration information of the link may further include a resource attribute (quantity).

The resource attribute may be a channel or an interference.

Optionally, the configuration information of the link may further include an interference measurement attribute.

The resource attribute or the interference measurement attribute or both are specific representations of the foregoing measurement attributes.

The interference measurement attribute may be an item of the foregoing X types of interference measurement. An identifier (for example, an index or a number) of the interference measurement attribute may be the same as or different from an identifier of the item of the foregoing X types of interference measurement.

When the resource attribute is a channel, the channel measurement attribute field may not exist in the configuration information of the link.

For example, a measurement attribute identifier indicated by the link is 1, indicating that a measurement behavior corresponding to the identifier of 1 is performed on a resource to which the link is directed. There may be more than one link indicating interference measurement, and each link indicates a measurement attribute of a resource to which the link is directed. The measurement attribute may include the foregoing resource attribute and/or interference measurement attribute.

Optionally, the foregoing resource includes a resource of a zero power channel state information reference signal. An attribute of the resource of the zero power channel state information reference signal (ZP CSI-RS) can only be an interference, and therefore a link indicating a related configuration of the resource may not include a resource attribute field (or information element), but includes an interference measurement attribute.

One link may include configuration information of a plurality of resources, and content (namely, one or more of the foregoing reporting setting identifier, resource attribute, interference measurement attribute, or channel measurement attribute) included in configuration information of each resource may be different. Optionally, each piece of configuration information of these resources may include configuration information corresponding to each resource setting identifier, and there is a correspondence between the configuration information and an order of resource setting identifiers. For example, the configuration information is sequentially indicated in the order of the resource setting identifiers. However, a resource attribute corresponding to a ZP CSI-RS resource may be null by default. For example, a link is directed to two resources having an interference measurement attribute, one of which is a ZP CSI-RS resource and the other is a non-ZP CSI-RS resource. In this case, the link indicates only one resource attribute (interference) but indicates two interference measurement attributes.

For example, a configuration form of the link may be as follows:

(1) An Attribute of Configuration Information is a Value

```
Link-Config ::=        SEQUENCE {
    Link-Id            Link-Id,
    Resource-setting-Id    INTEGER (0..154),
    Reporting-setting-Id   INTEGER (0..154),
    MeasureType            INTEGER (0..4) }
```

An attribute of configuration information is a vector

```
Link-Config ::=        SEQUENCE {
    Link-Id            Link-Id,
    Resource-setting-Id    INTEGER (0..154),
    Reporting-setting-Id   INTEGER (0..154),
    MeasureTypeList        SEQUENCE(SIZE(1..3)) of
                           MeasureType }
```

Manner 4, which is independent of or combined with Manner 1 to Manner 3 described above: The information about the resource for channel state information measurement includes information about resources available for channel measurement and information about resources for interference measurement, and the configuration information further includes second indication information, to indicate a quantity M of resources that are actually used for channel measurement, where M is an integer not less than 1.

In this manner, optionally, that the user equipment measures channel state information based on the configuration information, and feeds back the channel state information includes:

determining, by the user equipment based on the second indication information, the M resources that are actually used for channel measurement in the resources available for channel state information, and performing channel state information measurement and feedback based on the M resources that are actually used for channel measurement.

Optionally, performing the channel state information measurement based on the resources that are actually used for channel measurement includes: performing channel measurement on the resources that are actually used for channel measurement; or performing channel measurement on the resources that are actually used for channel measurement and performing interference measurement on a resource other than the M resources in the resources available for channel state information measurement.

For example, a configuration of the base station may be shown below in Table 6:

TABLE 6

| Type | Resource ID | Quantity of resources that are actually used for channel measurement |
|---|---|---|
| RS-setting | 1, 2 | 1 |
| IM-setting (ZP) | 3 | |

In this case, the UE can learn from the second indication information that a quantity of resources that are actually used for channel measurement is 1. A value of the second indication information may be of an int type, or may be of a bit type or another type, which is not limited herein. It can be learned from the configuration information that resources available for channel measurement are resources whose IDs are 1 and 2, and a resource for interference measurement is a resource whose ID is 3. For example, the value of the second indication information is of an int type. Because a quantity of the resources available for channel measurement is 2, a value of a quantity of the resources that are actually used for channel measurement may be "0", "1", or "2", respectively indicating zero, one, or two resources that are actually used for channel measurement. If the value of the second indication information is "2", it indicates that the resource whose ID is 1 and the resource whose ID is 2 are from two base stations in coordinated transmission, both results measured on the two resources are channels, and a joint channel is measured. If the value is "1", it indicates that the UE needs to obtain two CQI calculation results. In a possible case, the two CQI calculation results are obtained respectively when the resource whose ID is 1 is used for channel measurement and resources of other IDs are used for interference measurement, and when the resource whose ID is 2 is used for channel measurement and resources of other IDs are used for interference measurement. In another possible case, the two CQI calculation results are obtained respectively when the resource whose ID is 1 is used for channel measurement and the resource whose ID is 3 is used for interference measurement, and when the resource whose ID is 2 is used for channel measurement and the resource whose ID is 3 is used for interference measurement. This case differs from the former case in that a resource that is not used for channel measurement among the resources available for channel measurement is not used for interference measurement. Specifically, whether a resource that is not used for channel measurement among the resources available for channel measurement is used for interference measurement may be predefined in a protocol or separately configured by the base station. For example, the value of the second indication information is of a binary type, for example, may be "00", "01", "10", or "11". "01" may indicate that the resource whose ID is 1 is used for channel measurement, "10" may indicate that the resource whose ID is 2 is used for channel measurement, and "11" may indicate that the resources whose IDs are 1 and 2 are both used for channel measurement (joint channel). In other words, the second indication information may not only indicate the quantity of resources that are actually used for channel measurement, but also indicate which specific resource is used for channel measurement.

Optionally, a value of a field of the second indication information may be an int type 1 by default. In other words, only one resource can be used for channel measurement, that is, there is no joint channel. In this case, it may be predefined that the UE selects, in ascending order of resource IDs, one resource to be used for channel measurement, and the other resources are all used for interference measurement, to obtain several CQIs. Alternatively, a value range of a field of the second indication information may be the same as the quantity of resources available for channel measurement. For example, both the base station and the UE can learn of the quantity of resources available for channel measurement. For example, as shown above in the table, there are two resources available for channel measurement, and the field may have two bits to indicate the two resource IDs, respectively. In this embodiment of the present invention, a resource that is not used for channel measurement is used for interference measurement, and an interference power corresponding to a strongest interference may be obtained by default; or configuration may be performed separately by the base station. This is not limited herein.

Optionally, when the second indication information indicates the M resources that are actually used for channel measurement, another field (indication information) is used to indicate which measurement result in all possible measurement results needs to be reported by the UE. It may be understood that there may be one or more measurement results that need to be reported by the UE. For example, when resource IDs are 1, 2, 3, and 4, the second indication information is first used to indicate that the quantity of resources that are actually used for channel measurement is 1, and the UE can measure four possible CQIs. The base station indicates that the third measurement result in all the possible measurement results needs to be reported, and based on this, the UE can learn that the measurement result that needs to be reported is a CQI obtained when a resource whose ID is 3 is used for channel measurement. This indication manner can reduce UE reporting signaling overheads when a relatively large quantity of resource IDs exist and a plurality of IDs are used as channels.

For example, specific configuration information may be RRC signaling or DCI signaling. For example, the RRC signaling may be used to configure that RS setting includes resources whose IDs are 1, 2, and 3, and IM setting includes resources whose IDs are 4 and 5 (which may be briefly referred to as resources 4 and 5). The RRC signaling may further include the foregoing second indication information. Optionally, the RRC signaling may further include the foregoing field used to indicate which measurement result in all the possible measurement results needs to be reported by the UE. For example, the field of the second indication information is included in an RS setting field, or an RS-IM setting field, or an interference hypothesis setting) field, where the interference hypothesis setting field may be in a parallel relationship with the RS setting field and the IM setting field. When a configuration of the field of the second indication information (or a configuration of another field) needs to be changed, new configuration content may be delivered by using the RRC signaling again. In this case, only a configuration that needs to be changed may be delivered, or a set of RRC signaling (including the RS setting, the IM setting, the field of the second indication information, or another possible field) may be delivered. Alternatively, when a configuration needs to be changed, the configuration that needs to be changed is updated by using DCI signaling. For example, the value of the field of the second indication information is configured to "2" by using the DCI signaling, to indicate that a joint channel of two resource IDs is to be measured.

For example, a configuration of the base station is shown below in Table 7. For a physical meaning of a type, refer to the descriptions in Table 1.

TABLE 7

| Type | Resource IDs | Quantity of resources that are actually used for channel measurement |
|------|--------------|----------------------------------------------------------------------|
| 0    | 1, 2, 3      | 1                                                                    |
| 1    | 4, 5         |                                                                      |

In this case, the quantity, indicated by the second indication information, of resources that are actually used for channel measurement is 1, and the UE can learn that all cases in which one resource is used for channel measurement need to be obtained through measurement, and obtained CQIs may include values in three cases: 1/(2+3+4+5), 2/(1+3+4+5), and 3/(1+2+4+5), where a numerator is an ID of a resource used for channel measurement, and a denominator is IDs of resources used for interference measurement. A case in which two resources are used for channel measurement, for example, (1+2)/(3+4+5), is excluded.

In this manner, a plurality of measurement results that need to be obtained may be indicated by using the second indication information. Compared with a fixed indication of a measurement attribute, the plurality of measurement results are required, and a measurement attribute manner needs to be configured a plurality of times, so that signaling overheads can be reduced, and the plurality of measurement results are used for reference of the base station to make a decision during scheduling.

Manner 5, which may be independent of Manner 1 to Manner 4 or combined with any one of Manner 1 to Manner 3 described above: The information about the resource for channel state information measurement includes information about resources for channel measurement and information about resources available for interference measurement, and the configuration information further includes third indication information, to indicate a quantity N of resources that are actually used for interference measurement, where N is an integer not less than 0.

In this manner, optionally, that the user equipment measures channel state information based on the configuration information, and feeds back the channel state information includes:

determining, by the user equipment based on the third indication information, the N resources that are actually used for interference measurement in the resources available for channel state information, and performing channel state information measurement and feedback based on the resources for channel measurement, where performing the channel state information measurement based on the resources for channel measurement includes: performing channel measurement on the resources for channel measurement and performing interference measurement on the N resources.

For example, a configuration of the base station may be shown below in Table 8. For a specific physical meaning of a type, refer to the descriptions in Table 1.

TABLE 8

| Type | Resource IDs | Quantity of resources that are actually used for interference measurement |
|---|---|---|
| 0 | 1, 2 | |
| 1 | 3, 4, 5 | 2 |

If the quantity, indicated by the third indication information, of resources that are actually used for interference measurement is 2, it indicates that an interference measurement resource set includes two resources for interference measurement, for example, 3 and 4, 4 and 5, or 3 and 5. A value of a field of the third indication information may be of an int type, for example, may be "0", "1", "2", or "3"; or may be a binary type, for example, may be "00", "01", "10", or "11".

For example, after the quantity of resources that are actually used for interference measurement is determined, the corresponding quantity of resources may be selected for interference measurement from the resources available for interference measurement in ascending order of IDs, and then several corresponding CQIs are obtained. A resource that is not actually used for interference measurement in the resources available for interference measurement may be used neither for interference measurement nor for channel measurement, that is, ignored.

Similar to Manner 4, Manner 5 may further include indication information, to indicate which CQI in the several CQIs obtained according to a specific rule needs to be reported by the UE. It may be understood that there may be one or more CQIs that need to be reported by the UE.

Optionally, the third indication information may be included in RRC signaling or DCI signaling. For example, the field of the third indication information is included in an IM setting field, or an RS-IM setting field, or an interference hypothesis setting field, where the interference hypothesis setting field may be in a parallel relationship with the RS setting field and the IM setting field. It may be understood that the field in this embodiment of the present invention may include one or more than one information element.

Manner 6, which is independent of Manner 1 to Manner 5 or combined with Manner 1 to Manner 3 described above: The information about the resource for channel state information measurement includes information about resources available for channel measurement and information about resources available for interference measurement, the configuration information further includes second indication information and third indication information, the second indication information is used to indicate a quantity M of resources that are actually used for channel measurement, and the third indication information is used to indicate a quantity N of resources that are actually used for interference measurement, where M is an integer not less than 1, and N is an integer not less than 0.

In this manner, optionally, that the user equipment measures channel state information based on the configuration information, and feeds back the channel state information includes:

determining, by the user equipment based on the second indication information, the M resources that are actually used for channel measurement in the resources available for channel state information, determining, based on the third indication information, the N resources that are actually used for interference measurement in the resources available for channel state information, and performing channel state information measurement and feedback based on the M resources that are actually used for channel measurement. Optionally, performing the channel state information measurement based on the M resources that are actually used for channel measurement includes: performing channel measurement on the M resources that are actually used for channel measurement and performing interference measurement on the N resources that are actually used for interference measurement; or performing channel measurement on the M resources that are actually used for channel measurement and performing interference measurement on a resource other than the M resources in the resources available for channel state information measurement and the N resources.

For specific descriptions in this manner, refer to descriptions in Manner 4 and Manner 5. Details are not described herein again.

Manner 7, which may be independent of Manner 1 to Manner 6 or may be combined with any one of Manner 1 to Manner 3: The information about the resource for channel state information measurement includes information about resources available for channel measurement and information about resources for interference measurement, and the configuration information further includes fourth indication information, to indicate a quantity Y of transmission sets, where Y is an integer.

Optionally, the user equipment determines, based on the quantity Y of transmission sets that is indicated by the fourth indication information, Z resources that are actually used for channel measurement in the resources available for channel measurement, and performs channel state information measurement and feedback based on the Z resources that are actually used for channel measurement, where Z=k*Y, k is a quantity of resources for channel measurement included in each transmission set, and k is an integer not less than 1.

Optionally, performing the channel state information measurement based on the Z resources that are actually used for channel measurement includes: performing channel measurement on the Z resources that are actually used for channel measurement and performing interference measurement on a resource other than the Z resources in the resources available for channel state information measurement.

For example, a configuration of the base station may be shown below in Table 9. For a physical meaning of a type, refer to the descriptions in Table 1.

TABLE 9

| Type | Resource IDs | Quantity of transmission sets |
|---|---|---|
| 0 | 1, 2, 3, 4 | 1 |
| 1 | 5 | |

For example, in Table 9, the quantity Y of transmission sets is 1, and a quantity of resources for channel state information measurement that are included in one transmission set is 2. In this case, the UE can learn that the quantity of resources that are actually used for channel measurement in the resources available for channel measurement is 2. The UE may perform channel measurement on the two resources that are actually used for channel measurement and perform interference measurement on resources other than the two resources in the resources available for channel state information measurement, for example, (1+2)/(3+4+5), (1+3)/(2+4+5), (1+4)/(2+3+5), (2+3)/(1+4+5), (2+4)/(1+3+5), or (3+4)/(1+2+5). Alternatively, the UE may not perform measurement on a resource that is not used for channel measurement, for example, (1+2)/5, (1+3)/5, (1+4)/5, (2+3)/5, or (2+4)/5.

The fourth indication information may be included in higher layer signaling, or may be included in physical layer signaling. For example, the fourth indication information may be included in a CSI measurement setting field or a CSI process, and further, may be included in an RS-setting field.

Manner 8, which is independent of or combined with any one of Manner 1 to Manner 3: There are at least two resources corresponding to the channel measurement in the measurement attributes, and that the user equipment measures channel state information based on the configuration information, and feeds back the channel state information includes:

measuring and feeding back, by the user equipment, channel state information based on at least one of the at least two resources, where the measurement includes performing channel measurement on the at least one of the at least two resources and performing interference measurement on a resource other than the at least one of the at least two resources for channel measurement.

In this manner, the resources for channel measurement that are received by the UE are resources available for channel measurement, and several corresponding measurement results are obtained through various combinations of at least one of the resources available for channel measurement. During specific measurement, a resource that is not used for channel measurement may be used for interference measurement or may not be used for measurement. A specific manner may be configured by the base station or predefined according to a protocol. For example, if the configured resources available for channel measurement are resources whose IDs are 1, 2, and 3, the UE may obtain six pieces of CSI and report the CSI according to a predetermined rule.

Manner 9, which is independent of or combined with any one of Manner 1 to Manner 3: The resources for channel state information measurement may include an NZP CSI-RS resource (briefly referred to as an NZP resource) and/or a ZP CSI-RS resource (briefly referred to as a ZP resource). Whether the configuration information is configuration information of the NZP resource or configuration information of a ZP resource may be distinguished based on a difference between fields (or information elements) included in the configuration information of the NZP resource and the configuration information of the ZP resource. Because an attribute of the ZP resource is definite, that is, is an interference, a measurement behavior on the ZP resource can be known.

Optionally, if a measurement behavior performed when the NZP resource is used for interference measurement is unique, that is, the NZP resource has one interference measurement attribute, and a measurement behavior on the ZP resource is also unique, for example, if the measurement behavior (the interference measurement attribute) on the NZP resource is measuring a channel matrix and a precoding matrix of an interference and using a result of multiplication of the channel matrix and the precoding matrix as the interference, and the measurement behavior (the interference measurement attribute) on the ZP resource is measuring power information of an interference, because the configuration information of the NZP CSI-RS and the configuration information of the ZP CSI-RS include different fields (or information elements), the interference measurement attribute of the resource can be derived based on a quantity of fields of the resource. In this case, the configuration information of the NZP resource and the configuration information of the ZP resource can not only be distinguished by particularly specifying formats of the configuration information of the NZP resource and the configuration information of the ZP resource (such as locations and sizes of the configuration information of the NZP resource and the configuration information of the ZP resource in a message, or a value range of an identifier of the NZP resource and a value range of an identifier of the ZP resource) (this application does not exclude a possibility that the format is not particularly specified), but can also be distinguished based on a quantity of fields included in the configuration information, so that an interference measurement attribute (corresponding to an interference measurement behavior) of each resource is determined.

For example, in configuration information of an NZP and configuration information of a ZP in LTE, the ZP configuration has three fields, and the NZP configuration has six fields. In NR, the two resources NZP and ZP are not necessarily distinguished by name during resource configuration, and the two resources may both be referred to as interference measurement resources (IMR). As a possible manifestation, the value ranges of the identifiers of the two resources overlap, and because quantities of fields of an IMR 1 and an IMR 2 are different, it can be determined that the IMR 1 is the NZP and the IMR 2 is the ZP. Further, the NZP measurement behavior is unique, and the ZP measurement behavior is also unique, for example, the measurement behavior on the NZP resource is measuring a channel matrix and a precoding matrix of an interference and using a result of multiplication of the channel matrix and the precoding matrix as the interference, and the measurement behavior on the ZP resource is measuring power information of an interference. In this case, after whether an IMR is an NZP or a ZP is distinguished, a measurement behavior on the resource can be determined, that is, an interference measurement attribute of each resource can be determined.

Optionally, the configuration information of the ZP CSI-RS may be as follows, and the configuration information includes three fields:

```
CSI-RS-ConfigZP information elements
-- ASN1START
CSI-RS-ConfigZP-r11 ::=      SEQUENCE {
    csi-RS-ConfigZPId-r11        CSI-RS-ConfigZPId-r11,
    resourceConfigList-r11       BIT STRING (SIZE (16)),
    subframeConfig-r11           INTEGER (0..154),
    ...
}
```

Optionally, the configuration information of the NZP CSI-RS may be as follows, and the configuration information includes six fields:

```
CSI-RS-ConfigNZP information elements
-- ASN1START
CSI-RS-ConfigNZP-r11 ::=    SEQUENCE {
    csi-RS-ConfigNZPId-r11          CSI-RS-ConfigNZPId-r11,
    antennaPortsCount-r11           ENUMERATED {an1, an2, an4, an8},
    resourceConfig-r11              INTEGER (0..31),
    subframeConfig-r11              INTEGER (0..154),
    scramblingIdentity-r11          INTEGER (0..503),
    qcl-CRS-Info-r11                SEQUENCE {
        qcl-ScramblingIdentity-r11     INTEGER (0..503),
        crs-PortsCount-r11             ENUMERATED {n1, n2, n4, spare1},
        mbsfn-SubframeConfigList-r11   CHOICE {
            release                       NULL,
            setup                         SEQUENCE {
                subframeConfigList              MBSFN-SubframeConfigList
            }
        }
OPTIONAL -- Need ON
    }
OPTIONAL,-- Need OR
    ......
}
```

Based on any one of the configuration manners in Manner 1 to Manner 9, when feeding back the corresponding CSI, the UE may perform corresponding feedback according to a predefined rule, or may perform corresponding feedback based on an indication of the base station.

The predefined rule may be: The UE performs feedback based on sizes of IDs of resources used for channel measurement, for example, min(min(ΣIDRS), min(IDRS)). To be specific, CSI feedback is performed sequentially based on a smaller value between a minimum value of the IDs of the resources for channel measurement and a minimum value of sums of the IDs of the resources for channel measurement.

When channel measurement resources are consistent, feedback may be performed based on sizes of IDs of resources used for interference measurement, for example, min(min(ΣIDIM), min(IDIM)). To be specific, CSI feedback is performed sequentially based on a smaller value between a minimum value of the IDs of the resources for interference measurement and a minimum value of sums of the IDs of the resources for interference measurement.

Alternatively, CSI feedback may be performed based on max(min(ΣIDRS), min(IDRS)) and/or min(min(ΣIDIM), min(IDIM)).

It may be understood that the CSI feedback may also be performed based on another predetermined rule, which is not limited herein.

After a CSI feedback sequence is determined, the CSI may be fed back in an uplink data channel such as a physical uplink shared channel (PUSCH).

Optionally, the base station knows in advance a possible quantity of pieces of CSI, and may reserve a corresponding quantity of bits on the uplink data channel for CSI detection. During feedback, the UE sorts the pieces of CSI as predefined, and feeds back the CSI to the base station through the uplink data channel.

Optionally, each piece of CSI is fed back on an uplink control channel such as a physical uplink control channel (PUCCH) based on a defined period plus a respective offset.

Using a CQI as an example, an offset of the CQI may be configured by using a cqi-pmi-ConfigIndexList information element in RRC signaling, as follows:

```
CQI-ReportConfig information elements (CQI-ReportConfig information elements)
-- ASN1START
CQI-ReportPeriodic-r10 ::=    CHOICE {
    release                       NULL,
    setup                         SEQUENCE {
```

-continued

| | | |
|---|---|---|
| cqi-PUCCH-ResourceIndex-r10 | INTEGER (0..1184), | |
| cqi-PUCCH-ResourceIndexP1-r10 | INTEGER (0..1184) | |
| OPTIONAL,-- Need OR | | |
| cqi-pmi-ConfigIndexList | SEQUENCE(size(1..6)) | OF |
| cqi-pmi-ConfigIndex | | |

Because the base station knows how many CQI possibilities may exist on delivered resources based on the information about the measurement attributes indicated to the UE, a corresponding quantity of offsets and/or periods may be configured in the RRC signaling. In this way, the UE can perform feedback sequentially in a preset order on the uplink control channel based on the corresponding periods and offsets.

According to the method provided in this embodiment of the present invention, the UE can learn of a measurement attribute of a corresponding resource for CSI measurement. In addition, how to obtain a corresponding CSI measurement result by using the resource for CSI measurement can be learned through some indications of the base station. More CSI measurement results can be obtained with lower overheads, thereby supporting various transmission schemes of the base station, or improving efficiency of communication with the UE in a specific transmission scheme.

Figure 3:
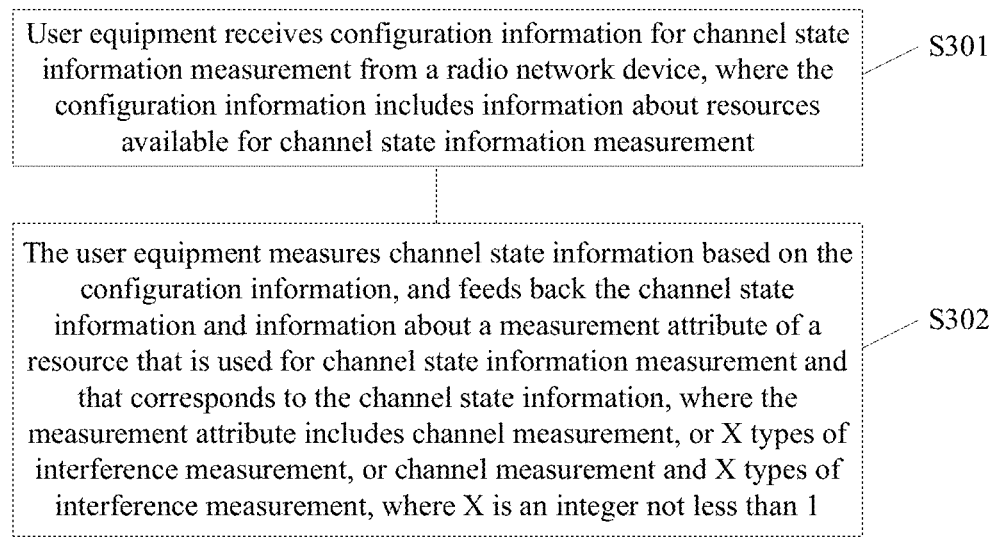
FIG. 3 is a schematic flowchart of another channel state information measurement method according to an embodiment of the present invention.

As shown in FIG. 3, an embodiment of the present invention provides another channel state information measurement method, including the following steps:

S301. User equipment receives configuration information for channel state information measurement from a radio network device, where the configuration information includes information about resources available for channel state information measurement.

S302. The user equipment measures channel state information based on the configuration information, and feeds back the channel state information and information about a measurement attribute of a resource that is used for channel state information measurement and that corresponds to the channel state information, where the measurement attribute includes channel measurement, or X types of interference measurement, or channel measurement and X types of interference measurement, and X is an integer not less than 1.

Correspondingly, the radio network device sends the configuration information for channel state information measurement to the user equipment, where the configuration information includes the information about the resources available for channel state information measurement; and receives the channel state information and the information about the measurement attribute of the resource that is used for channel state information measurement and that corresponds to the channel state information, where the channel state information and the information about the measurement attribute are fed back by the user equipment, the measurement attribute includes channel measurement, or X types of interference measurement, or channel measurement and X types of interference measurement, X is an integer not less than 1, and the resources for channel state information measurement are some or all of the resources available for channel state information measurement.

Optionally, the X types of interference measurement include at least one of measuring an interference (for example, an interference power) by using a zero power reference signal, obtaining P strongest interferences (where P is configurable or is predefined in a protocol without needing to be configured) by using a resource of a non-zero power channel state information reference signal, obtaining Q weakest interferences (where Q is configurable or is predefined in a protocol without needing to be configured) by using a resource of a non-zero power channel state information reference signal, obtaining an unprecoded interference (omnidirectional interference) by using a resource of a non-zero power channel state information reference signal, obtaining all interferences corresponding to all selectable precoding matrices in an available codebook by using a resource of a non-zero power channel state information reference signal, obtaining a non-strongest or -weakest interference corresponding to a specific precoding matrix (W) by using a resource of a non-zero power channel state information reference signal, and obtaining a precoded interference by using a non-zero power demodulation reference signal.

Optionally, the information about the measurement attribute of the resource that is used for channel state information measurement and that corresponds to the channel state information includes several bits, and each of the several bits is used to indicate a measurement attribute of each of resources that are used for channel state information measurement and that correspond to the channel state information. For example, if the UE feeds back a piece of CSI and corresponding measurement attribute information, such as 11000, it indicates that the CSI is obtained when resources corresponding to the first two bits are used for channel measurement, and resources corresponding to the last three bits are used for interference measurement.

Optionally, the measurement attribute of the resource corresponding to the CSI fed back by the UE may be determined based on a correspondence between a transmission scheme and CSI feedback. The transmission scheme includes NCJT (non-coherent joint transmission), CS/CB (coordinated scheduling and beamforming), DPS (dynamic point selection), DPB (dynamic point blanking), or the like. For example, when the transmission scheme is NCJT, the UE may calculate respective CQIs for resources for CSI measurement corresponding to two TRPs, and when the UE calculates one of the CQIs, a measurement result of an NZP resource of the other TRP is an interference by default (in other words, the NZP resource is used for interference measurement).

Optionally, the information about the measurement attribute of the resource that is used for channel state information measurement and that corresponds to the channel state information may be included in a CSI reporting setting (reporting setting) field.

Optionally, the foregoing transmission scheme may be configured in a transmission scheme setting field.

The foregoing method shown in FIG. 1 or FIG. 3 may be applied to an MU-MIMO (multi-user multiple-input multiple-output) scenario or a coordination scenario.

In the MU-MIMO scenario, one possible solution is as follows: A serving base station configures different measurement resources for each UE when scheduling a plurality of user equipments. A plurality of resources are configured for one user equipment. Some resources are used for channel measurement, and some resources are used for interference measurement. In this case, purposes of these resources can be distinguished by different types. In another possible solution, a plurality of scheduled user equipments use same measurement resources, and measurement results on these resources may be used as channels or as interferences in different CSI reports.

A possible solution in the coordination scenario is as follows: If UE is scheduled by a plurality of base stations, the different base stations may use a same measurement resource or may use different measurement resources when configuring measurement resources for the UE. The UE may detect two different CQIs on the same resource, which correspond to two coordinated base stations (for example, there are two coordinated base stations), respectively. In this case, an NZP resource may not only be used as a channel, but may also be used as an interference, and the NZP resource may be configured as Type 0 (channel) in a type of CSI report calculation, and configured as Type 1 (interference) in another type of CSI report calculation. If the two base stations invoke different measurement resources, the UE measures two CQIs on two groups of measurement resources, respectively.

The methods provided in the embodiments of the present invention are not limited to being applied to the MU-MIMO or coordination scenario, but may also be applied to another scenario. This is not limited herein.

According to the methods provided in the embodiments of the present invention, corresponding CSI can be measured under different interference hypotheses (that is, a same resource can not only be used for channel measurement, but can also be used for interference measurement), so that the base station can select a more precise transmission set based on CSI measurement results.

It may be understood that the embodiments of the present invention are described by using a 4G network scenario in a wireless communications network as an example. It should be noted that the solutions in the embodiments of the present invention may also be applied to other wireless communications networks, and corresponding names may also be replaced with names of corresponding functions in the other wireless communications networks.

It should be noted that the methods or apparatuses in the embodiments of the present invention may be applied to communication between a base station and user equipment, or may be applied communication between a base station and another base station (for example, between a macro base station and a micro base station), or may be applied to communication between user equipments (for example, in a D2D scenario). In all embodiments of the present invention, communication between a base station and UE is used as an example for description.

Figure 4:
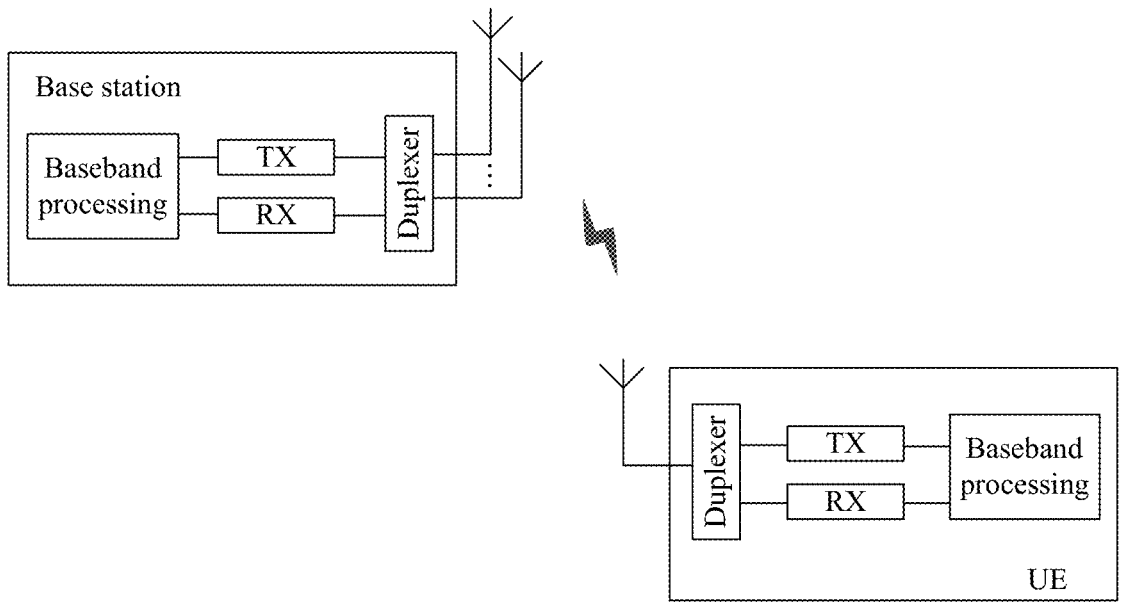
FIG. 4 is a schematic diagram of internal structures of a base station and UE according to an embodiment of the present invention.

FIG. 4 is a simplified schematic diagram of internal structures of the foregoing base station and UE.

For example, the base station may include an antenna array, a duplexer, a transmitter (TX) and a receiver (RX) (sometimes, the TX and RX are collectively referred to as a transceiver TRX), and a baseband processing part. The duplexer is configured to enable the antenna array to be used for both signal sending and signal receiving. The TX is configured to implement conversion between a radio frequency signal and a baseband signal. The TX may usually include a power amplifier PA, a digital-to-analog converter DAC, and a frequency converter. The RX may usually include a low noise amplifier LNA, an analog-to-digital converter ADC, and a frequency converter. The baseband processing part is configured to implement processing of a sent or received signal, such as layer mapping, precoding, modulation/demodulation, and encoding/decoding, and separately process a physical control channel, a physical data channel, a physical broadcast channel, a reference signal, and the like.

In an example, the base station may further include a control part, configured to perform multi-user scheduling and resource allocation, pilot scheduling, user physical layer parameter configuration, and the like.

For example, the UE may include an antenna, a duplexer, a transmitter (TX) and a receiver (RX) (sometimes, the TX and RX are collectively referred to as a transceiver TRX), and a baseband processing part. In FIG. 4, the UE has a single antenna. It may be understood that the UE may also have a plurality of antennas (that is, an antenna array).

The duplexer is configured to enable the antenna array to be used for both signal sending and signal receiving. The TX is configured to implement conversion between a radio frequency signal and a baseband signal. The TX may usually include a power amplifier PA, a digital-to-analog converter DAC, and a frequency converter. The RX may usually include a low noise amplifier LNA, an analog-to-digital converter ADC, and a frequency converter. The baseband processing part is configured to implement processing of a sent or received signal, such as layer mapping, precoding, modulation/demodulation, and encoding/decoding; and separately process a physical control channel, a physical data channel, a physical broadcast channel, a reference signal, and the like.

In an example, the UE may also include a control part, configured to request an uplink physical resource, calculate channel state information (CSI) corresponding to a downlink channel, determine whether a downlink data packet is successfully received, and so on.

Figure 5:
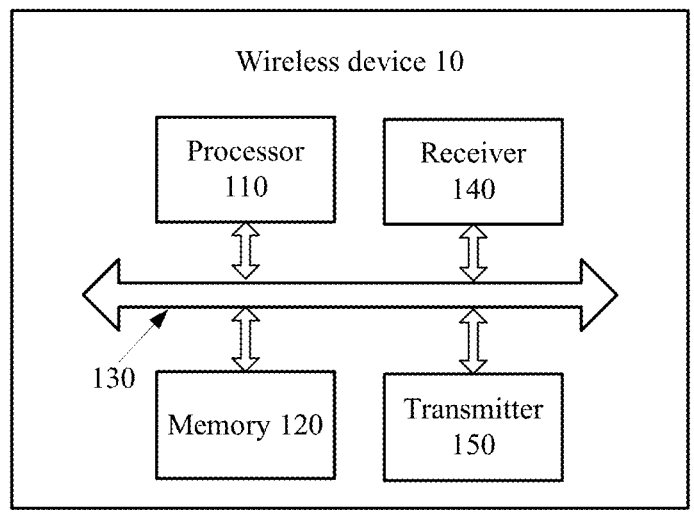
FIG. 5 is a schematic diagram of an apparatus for channel state information measurement (for example, a radio network device) according to an embodiment of the present invention.

According to the foregoing methods, as shown in FIG. 5, an embodiment of the present invention further provides a channel state information measurement apparatus. The apparatus may be a wireless device 10. The wireless device 10 may correspond to the first radio network device in the foregoing method. The first radio network device may be a base station or may be another device. This is not limited herein.

The apparatus may include a processor 110, a memory 120, a bus system 130, a receiver 140, and a transmitter 150. The processor 110, the memory 120, the receiver 140, and the transmitter 150 are connected through the bus system 130. The memory 120 is configured to store an instruction. The processor 110 is configured to execute the instruction stored in the memory 120, to control the receiver 140 to receive a signal, and control the transmitter 150 to send a signal, so as to complete the steps of the radio network device (for example, the base station) in the foregoing method. The receiver 140 and the transmitter 150 may be a same physical entity or different physical entities. When being the same physical entity, the receiver 140 and the transmitter 150 may be collectively referred to as a transceiver. The memory 120 may be integrated into the processor 110 or may be disposed separately from the processor 110.

In an implementation, functions of the receiver 140 and the transmitter 150 may be implemented by using a transceiver circuit or a dedicated transceiver chip. The processor 110 may be implemented by a dedicated processing chip, a processing circuit, a processor, or a general-purpose chip.

In another implementation, the wireless device provided in this embodiment of the present invention may be implemented by using a general-purpose computer. To be specific, program code for implementing the functions of the processor 110, the receiver 140, and the transmitter 150 is stored in the memory, and a general-purpose processor implements the functions of the processor 110, the receiver 140, and the transmitter 150 by executing the code in the memory.

For concepts, explanations, detailed descriptions, and other steps that are in the apparatus and are related to the technical solutions provided in the embodiments of the present invention, refer to the descriptions of the content in the foregoing methods or other embodiments, and details are not described herein again.

Figure 6:
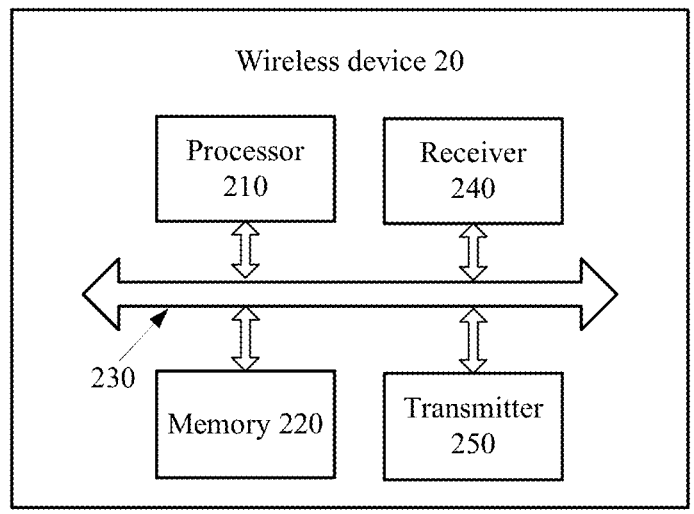
FIG. 6 is a schematic diagram of another apparatus for channel state information measurement (for example, user equipment) according to an embodiment of the present invention.

According to the foregoing methods, as shown in FIG. 6, an embodiment of the present invention further provides another channel state information measurement apparatus. The apparatus may be a wireless device 20. The wireless device 20 may correspond to the second radio network device in the foregoing method. It may be understood that the second radio network device may be UE or may be a micro base station or a small cell. This is not limited herein.

The apparatus may include a processor 210, a memory 220, a bus system 230, a receiver 240, and a transmitter 250. The processor 210, the memory 220, the receiver 240, and the transmitter 250 are connected through the bus system 230. The memory 220 is configured to store an instruction. The processor 210 is configured to execute the instruction stored in the memory 220, to control the receiver 240 to receive a signal, and control the transmitter 250 to send a signal, so as to complete the steps of the UE in the foregoing method. The receiver 240 and the transmitter 250 may be a same physical entity or different physical entities. When being the same physical entity, the receiver 240 and the transmitter 250 may be collectively referred to as a transceiver. The memory 220 may be integrated into the processor 210 or may be disposed separately from the processor 210.

In an implementation, functions of the receiver 240 and the transmitter 250 may be implemented by using a transceiver circuit or a dedicated transceiver chip. The processor 210 may be implemented by a dedicated processing chip, a processing circuit, a processor, or a general-purpose chip.

In another implementation, the wireless device provided in this embodiment of the present invention may be implemented by using a general-purpose computer. To be specific, program code for implementing the functions of the processor 210, the receiver 240, and the transmitter 250 is stored in the memory, and a general-purpose processor implements the functions of the processor 210, the receiver 240, and the transmitter 250 by executing the code in the memory.

For concepts, explanations, detailed descriptions, and other steps that are in the apparatus and are related to the technical solutions provided in the embodiments of the present invention, refer to the descriptions of the content in the foregoing methods or other embodiments, and details are not described herein again.

According to the method provided in the embodiments of the present invention, an embodiment of the present invention further provides a communications system, including the foregoing first radio network device and one or more than one user equipment.

It should be understood that in the embodiments of the present invention, the processor 110 or 210 may be a central processing unit ("CPU" for short), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 120 or 220 may include a read-only memory and a random access memory, and provide an instruction and data to the processor 310. A part of the memory may further include a non-volatile random access memory. For example, the memory may further store information of a device type.

The bus system 130 or 230 may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logical circuit in the processor 110 or 210, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It should be further understood that first, second, third, fourth, and various numerical sequence numbers in this specification are merely used for distinguishing for convenience of description, and are not intended to limit the scope of the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

In addition, the following embodiments are further provided in this application and are applied to a process of configuration and/or triggering and reporting of channel state information. Solutions described in the following embodiments may be used alone or in combination with any one or more of the solutions described above in this application. For example, in the entire process of channel state information configuration, measurement, and reporting, channel state information measurement may be first implemented by using any channel state information measurement method provided above in this application, then triggering or configuration of channel state information reporting is completed by using any channel state information reporting method provided below in this application, and the channel state information reporting is completed.

To improve performance of user equipment (UE), a plurality of network devices may coordinate to provide data transmission for the UE. In this case, the UE may obtain channel state information of the plurality of network devices through measurement, and report the channel state information to at least one of the plurality of network devices, thereby facilitating coordination and scheduling of the plurality of network devices. For example, in a non-coherent joint transmission (NCJT) scenario, when a network side (for example, a serving network device) is to determine whether two network devices are suitable for coordination, the serving network device (for example, a TRP 1) configures two channel state information measurement configurations for the UE. In one channel state information measurement configuration, the TRP 1 is used as a channel, and a network device to participate in coordination (for example, a TRP 2) is used as an interference in a coordination set. In the other channel state information measurement configuration, the TRP 2 is used as a channel, and the TRP 1 is used as an interference in a coordination set. For each of the two channel state information measurement configurations, one channel state information measurement result is obtained. The TRP 1 needs to obtain two channel state information measurement results reported by the UE, thereby learning of statuses of the two channels when the TRP 1 and the TRP 2 perform NCJT; and determine a system throughput when the TRP 1 and the TRP 2 perform NCJT, thereby determining or deciding coordination and scheduling situations. The UE may further obtain, through measurement, channel state information of other network devices that do not provide data transmission for the UE, and the channel state information may be reported as interference measurement results to network devices that provide data transmission for the UE, thereby facilitating coordination and scheduling between the network devices. For example, in a dynamic point blanking (DPB) scenario, a TRP 2 is an interference source for the UE, and an interference to the UE can be reduced by muting the TRP 2. In a channel state information measurement phase, a TRP 1 may configure two channel state information measurement configurations for the UE. In one channel state information measurement configuration, an interference from the TRP 2 is considered, and in the other channel state information measurement configuration, it is considered that the muted TRP 2 does not cause an interference to the UE. After receiving the two channel state information measurement configurations, the UE measures channel state information measurement results respectively in cases of the interference from the TRP2 and of no interference from the TRP 2, and reports the channel state information measurement results to the TRP 1, so that the TRP1 can determine a change amount of channel quality after the TRP 2 is muted, and indicate whether the TRP 2 is muted during scheduling.

When the UE needs to report pieces of channel state information, the network device usually needs to receive the pieces of channel state information as soon as possible, so as to perform coordination and scheduling at a next moment based on all information. Therefore, a channel state information triggering and reporting manner is needed to minimize a delay between reporting of the pieces of channel state information, so that the network device can utilize the pieces of channel state information to perform coordination and scheduling as soon as possible.

An embodiment of this application provides a communications system, and the communications system may include at least one network device and at least one UE. The network device may be a device on an access network side for supporting the UE to access the system, such as a base station (BS), a relay node, an access point (AP), or a transmission/reception point (TRP). The base station may be a macro base station, a micro base station, a home base station, or the like. The network device may be fixed or may be mobile. In this embodiment of this application, the UE may be referred to as a terminal, a mobile station, a subscriber unit, a station, or the like. The UE may be a cellular phone, a personal digital assistant (PDA), a wireless modem, a wireless communications device, a handheld device, a laptop computer, a cordless phone, a wireless local loop (WLL) station, a tablet computer (pad), or the like. With the development of Internet of Things technologies, any device that can access a wireless communications network, can communicate with a system side in a radio network, or can communicate with other objects through a radio network may be the UE in this embodiment of this application, for example, a terminal and an automobile in intelligent transportation, a household appliance in smart household, a terminal, a power meter reading instrument, a voltage monitoring instrument, and an environmental monitoring instrument in smart grid, and a video surveillance instrument and a cash register in a smart security network. In this embodiment of this application, the UE may communicate with a network device. The UE may be motionless or may be mobile.

Figure 7:
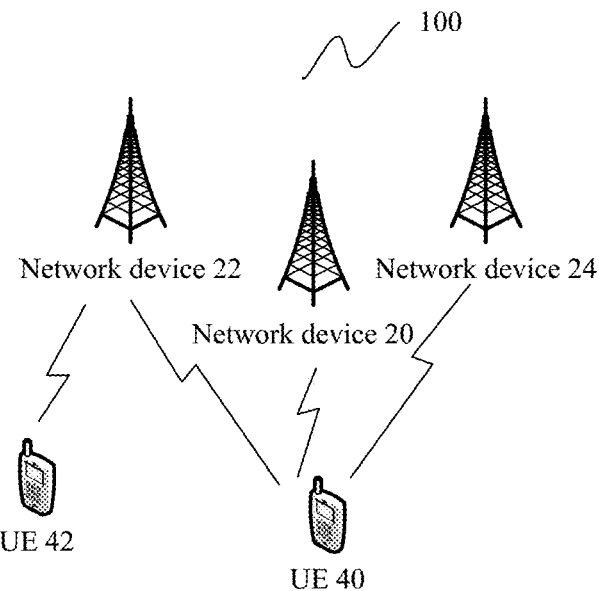
FIG. 7 is a schematic diagram of a communications system according to an embodiment of the present invention.

As shown in FIG. 7, an embodiment of this application provides a communications system 100. The communications system 100 includes at least one network device and at least one user equipment. The UE accesses the network device through a wireless interface for communication, or may communicate with another UE, for example, communication in a D2D (device-to-device) or M2M (machine-to-machine) scenario. The network device may communicate with the UE, or may communicate with another network device, for example, communication between a macro base station and an access point. In the communications system 100, one network device may provide a communication service for one or more UEs, for example, a network side device 22 provides a communication service for UE 42; and one UE may also communicate with a plurality of network devices on a same carrier, for example, UE 40 may simultaneously receive, on a same carrier, downlink data transmitted by a network device 20, the network device 22, and a network device 24.

The communications system 100 includes, but is not limited to, for example, code division multiple access (CDMA), time division multiple access (DMA), frequency division multiple access (FDMA), orthogonal frequency division multiple access (OFDMA), and single carrier frequency division multiple access (SC-FDMA) systems, and another network, for example, a further evolved system subsequent to a 3GPP Long Term Evolution (LTE) system, or a new radio access technologysystem (which may be briefly referred to as an "NR" system), or a 5G system or any next-generation system developed by a standards organization. The terms "network" and "system" in the embodiments of the present invention are interchangeable. A CDMA network can implement wireless technologies such as universal terrestrial radio access (universal terrestrial radio access, UTRA) and CDMA2000. UTRA may include WCDMA (WCDMA) or another variant of CDMA. CDMA2000 may cover Interim Standard (interim standard, IS) 2000 (IS-2000), IS-95, and IS-856 standards. A TDMA network can implement wireless technologies such as a Global System for Mobile Communications (Global System for Mobile Communications, GSM). An OFDMA network can implement wireless technologies such as evolved universal terrestrial radio access (evolved UTRA, E-UTRA), Ultra Mobile Broadband (ultra mobile broadband, UMB), IEEE 802.11 (Wi-Fi), IEEE 802.16 (WiMAX), IEEE 802.20, and Flash OFDMA. UTRA and E-UTRA are UMTS and an evolved version of UMTS. 3GPP Long Term Evolution (LTE) and LTE Advanced (LTE-A) are new versions of UMTS using E-UTRA. UTRA, E-UTRA, UMTS, LTE, LTE-A, and GSM are all recorded and described in documents of the 3GPP standards organization. CDMA2000 and UMB are recorded and described in documents of the 3GPP2 standards organization.

The channel state information (CSI) described in this application is information for reporting a channel and/or interference measurement result. For example, the CSI may include at least one of a rank indicator (RI), a precoding matrix indicator (PMI), a channel quality indicator (CQI), a CSI-RS resource indicator (CRI), and a precoding type indicator (precoding type indicator, PTI). The CSI may include aperiodically reported CSI, periodically reported CSI, or semi-persistently reported (semi-persistent reporting) CSI. The aperiodically reported CSI is reported based on triggering of the network device. The periodically reported CSI is reported based on a reporting period configured by the network device. The semi-persistently reported CSI is periodically reported within a specific period of time based on a reporting period configured by the network device and triggering of the network device, and is not reported outside this period of time. Reporting of the semi-persistently reported CSI may usually be activated/deactivated by using signaling. After receiving activation signaling, the terminal reports the CSI based on a configured reporting period and offset. After receiving deactivation signaling, the terminal stops reporting.

A piece of CSI described in this application is CSI reported after one CSI measurement resource is measured, or is CSI reported after one channel state information reference signal resourceis measured, or is CSI reported based on a piece of CSI reporting configuration (CSI reporting setting) information. A piece of aperiodically reported CSI is CSI that is reported once after a CSI measurement resource is measured. A piece of periodically reported CSI is CSI that is periodically reported many times after a CSI measurement resource is measured. A piece of semi-persistently reported CSI is CSI that is periodically reported many times within a specific period of time after a CSI measurement resource is measured. Therefore, a piece of CSI in this application may also be understood as a set of CSI. In a case of aperiodic reporting, the set of CSI includes CSI reported once. In a case of periodic reporting or semi-persistent reporting, the set of CSI includes CSI that is reported many times.

"CSI reporting" and "CSI feedback" described in this application are interchangeable, and both refer to a process in which the UE sends CSI to the network device. The process may further include a process of triggering or configuration of CSI reporting.

"Indication information" described in this application may include signaling or information of different layers, for example, may include layer 1, layer 2, or layer 3 signaling or information. Generally, the layer 1 is a physical layer, the layer 2 is a medium access control (MAC) layer, and the layer 3 is a radio resource control (RRC) layer. For example, the indication information may be DCI of the physical layer, or a MAC control element (MAC CE) of the MAC layer, or RRC signaling of the RRC layer.

A "carrier" described in this application corresponds to a specific frequency band, for example, a frequency band with a center frequency of 1.8 GHz or a frequency band of a center frequency of 28 GHz.

A beam described in this application is a radio wave having a direction and shape in space and formed when a radio signal is transmitted or received through at least one antenna port. The beam may be formed by weighting an amplitude and/or phase of data transmitted or received through the at least one antenna port, or may be formed by using another method, for example, by adjusting related parameters of an antenna unit. The beam, which may be understood as a spatial resource, may be a transmit or receive precoding vector or precoding matrix having energy transmission directionality, and the transmit or receive precoding vector or precoding matrix may be identified by using index information. The energy transmission directionality may mean that at a specific spatial location, a signal precoded by using the precoding vector or precoding matrix is received at a relatively good receive power, for example, meets a signal to noise ratio for reception demodulation. The energy transmission directionality may also mean that a same signal that is sent from different spatial locations and that is received by using the precoding vector or precoding matrix has different received powers. A same wireless communications device (such as user equipment or a network device) may have different precoding vectors or precoding matrices, and different devices may also have different precoding vectors or precoding matrices, that is, correspond to different beams. A wireless communications device can use one or more of the plurality of different precoding vectors or precoding matrices at the same time. In other words, one or more beams can be formed at the same time.

A beam pair described in this application includes a transmit beam at a transmit end and a receive beam at a receive end, or includes an uplink beam and a downlink beam. For example, the beam pair may include a transmit beam of a base station and a receive beam of UE, or a transmit beam of UE and a receive beam of a base station.

The beam may be identified by using index information (for example, index information of a precoding vector or index information of a precoding matrix). Optionally, the index information may correspond to or include a resource identifier (identity, ID) configured for the UE. For example, the index information may be a channel state information reference signal (CSI-RS) ID or resource configured for the UE, or may be a configured uplink sounding reference signal (SRS) ID or resource. Alternatively and optionally, the index information may be index information explicitly or implicitly carried by a signal or channel carried on a beam. For example, the index information of the beam may be indicated by using a synchronization signal or broadcast channel sent over the beam. The beam may be identified by using a CSI-RS resource number and/or an antenna port number used for the transmit or receive beam, or may be identified by using a beam pair number or a beam pair index, or may be identified by using a synchronization signal block time index (synchronization signal block time index, SS block time index). A specific indication or identification manner of the beam is not limited in this application.

"Antenna ports (antenna port(s))" described in this application are different logical ports defined to distinguish between different channels, and a channel through which a symbol sent on an antenna port passes may be determined based on a channel through which another symbol sent on the same antenna port passes. For example, a data receive end may perform channel estimation and data demodulation by using a DM-RS (demodulation reference signal) sent on the same antenna port as that used for sending data. The "antenna port number" described in this application is used to indicate a specific antenna port. For example, an antenna port number of 7 indicates an antenna port 7.

Figure 8A:
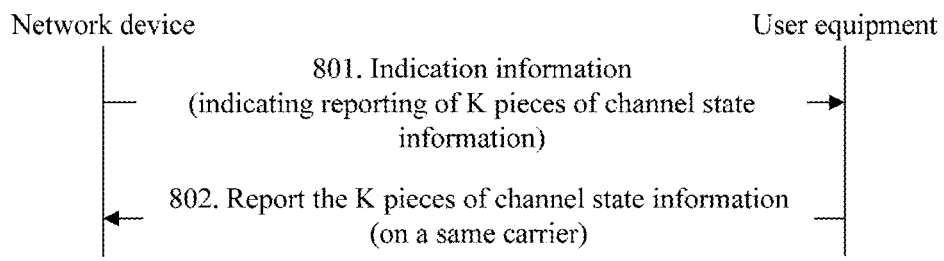
FIG. 8a is a schematic diagram of a channel state information reporting procedure according to an embodiment of the present invention.

FIG. 8a is a flowchart of CSI reporting according to an embodiment of this application.

In part 801, a network device sends a piece of indication information to user equipment, where the indication information is used to indicate reporting of K pieces of CSI, K≥2, and the K pieces of CSI are obtained by the user equipment by measuring measurement resources on a same carrier.

Optionally, the network device may be a serving network device of the user equipment.

Optionally, the K pieces of CSI may be K pieces of aperiodically reported CSI, or may be K pieces of periodically reported CSI, or may be K pieces of semi-persistently reported CSI. When the K pieces of CSI are aperiodically reported CSI or K pieces of semi-persistently reported CSI, the indication information may be physical layer signaling, for example, downlink control information (DCI). When the K pieces of CSI are periodically reported CSI, the indication information may be RRC signaling, for example, signaling for configuring the periodically reported CSI. Certainly, the indication information may also be other signaling or information of the physical layer or the RRC layer, or may be signaling or information of another layer, for example, a MAC CE of a MAC layer. This application does not limit a type and name of the indication information, or limit a type of indication information corresponding to different CSI. This may be designed according to system requirements.

In part 802, the user equipment reports the K pieces of CSI on the same carrier.

Optionally, the K pieces of CSI may be reported at the same time or may be reported at different times.

Reporting of two or more than two pieces of CSI on the same carrier is indicated by using one piece of indication information, and a delay caused by separately triggering a plurality of CSI can be reduced, so that the network device can obtain more pieces of CSI faster, thereby performing coordination and/or scheduling based on the more pieces of CSI. Further, when the K pieces of CSI are reported at the same time, time required for the network device to obtain the K pieces of CSI can be further shortened, thereby performing coordination and/or scheduling based on more pieces of CSI as fast as possible.

Optionally, when the K pieces of CSI are the aperiodically reported CSI or the K pieces of semi-persistently reported CSI, the indication information is used to trigger the reporting of the K pieces of CSI. After receiving the indication information, the user equipment performs CSI measurement and reporting.

In a specific design, the indication information includes index information of the K CSI reporting configurations (CSI reporting setting). An index of a CSI reporting configuration indicates a piece of specific CSI reporting configuration information that is configured for the UE. The CSI reporting configuration information may include at least one of a reported CSI parameter, a CSI type, codebook configuration information, a time-domain behavior, and a frequency granularity of a CQI and a PMI. The user equipment determines a specific CSI reporting configuration based on the index of the CSI reporting configuration, and performs CSI measurement and reporting based on the CSI reporting configuration.

Optionally, the index information of the CSI reporting configuration may be value information of a CSI reporting configuration index, or may be other information used to determine a CSI reporting configuration index. For example, when a CSI reporting configuration that needs to be indicated is related to a CSI measurement configuration (CSI measurement setting) or a link configuration (link setting), the CSI reporting configuration index may be indicated by indicating the CSI measurement configuration or the link configuration. After obtaining information about the CSI measurement configuration or the link configuration in the indication information, the user equipment determines, based on the information about the CSI measurement configuration or the link configuration, the CSI reporting configuration index included in the CSI measurement configuration or the link configuration, thereby determining the CSI reporting configuration information and completing CSI measurement and reporting.

In another specific design, the indication information includes index information of CSI reporting configuration groups to which the K pieces of channel state information belong. The CSI reporting configuration group is a set including at least one CSI reporting configuration. An index of the CSI reporting configuration group indicates the specific CSI reporting configuration group. The network device may notify the UE of grouping information of specific CSI reporting configurations in advance, and then use the indication information indicate CSI reporting configuration groups in which CSI is to be reported by the UE.

For example, the network device may configure CSI reporting configuration groups in higher layer signaling (for example, RRC signaling). For example, the network device configures, by using the RRC signaling, that a CSI reporting configuration set 1 (CSI reporting setting set 1) includes a CSI reporting configuration 1 (CSI reporting setting 1) and a CSI reporting configuration 2 (CSI reporting setting 2), a CSI reporting configuration set 2 (CSI reporting setting set 2) includes the CSI reporting configuration 1 (CSI reporting setting 1) and a CSI reporting configuration 3 (CSI reporting setting 3), and a CSI reporting configuration set 3 (CSI reporting setting set 3) includes the CSI reporting configuration 2 (CSI reporting setting 2) and the CSI reporting configuration 3 (CSI reporting setting 3). Then, the network device uses the indication information (for example, DCI) to indicate an index of the CSI reporting configuration set, thereby triggering reporting of CSI in at least one of the foregoing sets. Based on the current example, Table 10 provides a specific information element design. The information element "CSI request" is included in the indication information to indicate the CSI reporting configuration set.

TABLE 10

| Value of CSI request field | Description |
| --- | --- |
| '00' | No aperiodic CSI reporting is triggered |
| '01' | Aperiodic CSI reporting of a CSI reporting configuration set 1 configured by a higher layer is triggered |
| '10' | Aperiodic CSI reporting of a CSI reporting configuration set 2 configured by a higher layer is triggered |
| '11' | Aperiodic CSI reporting of a CSI reporting configuration set 3 configured by a higher layer is triggered |

For another example, the network device configures, by using the RRC signaling, that a CSI reporting configuration set 1 (CSI reporting setting set 1) includes a CSI reporting configuration 1 (CSI reporting setting 1), a CSI reporting configuration set 2 (CSI reporting setting set 2) includes a CSI reporting configuration 2 (CSI reporting setting 2), and a CSI reporting configuration set 3 (CSI reporting setting set 3) includes a CSI reporting configuration 3 (CSI reporting setting 3). Then, the network device uses the indication information (for example, DCI) to trigger reporting of CSI in at least one of the foregoing sets. Based on the current example, Table 11 provides a specific information element design. The information element "CSI request" is included in the indication information to indicate the CSI reporting configuration set.

TABLE 11

| Value of CSI request field | Description |
| --- | --- |
| '000' | No aperiodic CSI reporting is triggered |
| '001' | Aperiodic CSI reporting of a CSI reporting configuration set 1 configured by a higher layer is triggered |
| '010' | Aperiodic CSI reporting of a CSI reporting configuration set 2 configured by a higher layer is triggered |
| '011' | Aperiodic CSI reporting of a CSI reporting configuration set 3 configured by a higher layer is triggered |
| '100' | Aperiodic CSI reporting of a CSI reporting configuration set 1 configured by a higher layer is triggered<br>Aperiodic CSI reporting of a CSI reporting configuration set 2 configured by a higher layer is triggered |
| '101' | Aperiodic CSI reporting of a CSI reporting configuration set 1 configured by a higher layer is triggered<br>Aperiodic CSI reporting of a CSI reporting configuration set 3 configured by a higher layer is triggered |
| '110' | Aperiodic CSI reporting of a CSI reporting configuration set 2 configured by a higher layer is triggered<br>Aperiodic CSI reporting of a CSI reporting configuration set 3 configured by a higher layer is triggered |
| '111' | Aperiodic CSI reporting of a CSI reporting configuration set 1 configured by a higher layer is triggered<br>Aperiodic CSI reporting of a CSI reporting configuration set 2 configured by a higher layer is triggered<br>Aperiodic CSI reporting of a CSI reporting configuration set 3 configured by a higher layer is triggered |

Optionally, the index of the CSI reporting configuration group may be indicated to the UE by using other information. For example, a CSI reporting configuration that belongs to a CSI measurement configuration group or a link configuration group may be indicated by indicating the CSI measurement configuration group or the link configuration group.

For example, the network device may configure CSI measurement configuration groups in higher layer signaling (for example, RRC signaling). For example, the network device configures, by using the RRC signaling, that a CSI measurement configuration set 1 (CSI measurement setting set 1) includes a CSI measurement configuration 1 (CSI measurement setting 1) and a CSI measurement configuration 2 (CSI measurement setting 2), a CSI measurement configuration set 2 (CSI measurement setting set 2) includes the CSI measurement configuration 1 (CSI measurement setting 1) and a CSI measurement configuration 3 (CSI reporting setting 3), and a CSI measurement configuration set 3 (CSI measurement setting set 3) includes the CSI measurement configuration 2 (CSI measurement setting 2) and the CSI measurement configuration 3 (CSI measurement setting 3). Then, the network device uses the indication information (for example, DCI) to indicate an index of the CSI measurement configuration set, thereby triggering reporting of CSI in a CSI reporting configuration included in at least one of the foregoing sets. Based on the current example, Table 12 provides a specific information element design. The information element "CSI request" is included in the indication information to indicate the CSI measurement configuration set. After receiving the indication information, the user equipment may determine a currently configured CSI measurement configuration set based on the indication, and then determine a CSI reporting configuration index included in a CSI measurement configuration based on a CSI measurement configuration index included in the CSI measurement configuration set, thereby learning of CSI reporting configuration information that needs to be reported.

TABLE 12

| Value of CSI request field | Description |
|---|---|
| '00' | No aperiodic CSI reporting is triggered |
| '01' | Aperiodic CSI reporting of a CSI measurement configuration set 1 configured by a higher layer is triggered |
| '10' | Aperiodic CSI reporting of a CSI measurement configuration set 2 configured by a higher layer is triggered |
| '11' | Aperiodic CSI reporting of a CSI measurement configuration set 3 configured by a higher layer is triggered |

In the foregoing embodiment, the indication information only needs to include the index information of the CSI reporting configuration, without needing to include specific CSI reporting configuration information, thereby reducing signaling overheads.

Certainly, the reporting of the K pieces of CSI may be indicated at the same time by using the foregoing two methods. For example, reporting of some pieces of CSI is indicated by using index information of CSI reporting configurations, and reporting of the other pieces of CSI is indicated by using index information of CSI reporting configuration groups to which the pieces of CSI belong.

Optionally, the reporting of the K pieces of CSI and other types of CSI reporting (for example, CSI reporting in a carrier aggregation scenario) in the prior art may be jointly indicated. For example, an information element may be used in the indication information, and different values of the information element may be used to indicate different CSI reporting. Table A provides an example of a specific information element design. The two states '10' and '11' in Table A may indicate triggering one CSI reporting configuration set in a case of a plurality of carriers, that is, CSI reporting included in one CSI reporting configuration set may be performed on different CCs. The state '01' indicates triggering one CSI reporting configuration set on one carrier, that is, CSI reporting included in the CSI reporting configuration set is performed on a same carrier.

TABLE A

| Value of CSI request field | Description |
|---|---|
| '00' | No aperiodic CSI reporting is triggered |
| '01' | Aperiodic CSI reporting (reporting on a same carrier) in a CSI reporting configuration set 1 of a serving cell configured by a higher layer is triggered |
| '10' | Aperiodic CSI reporting (reporting on different carriers) in a CSI reporting configuration set 2 configured by a higher layer is triggered |
| '11' | Aperiodic CSI reporting (reporting on different carriers) in a CSI reporting configuration set 3 configured by a higher layer is triggered |

Figure 8B:
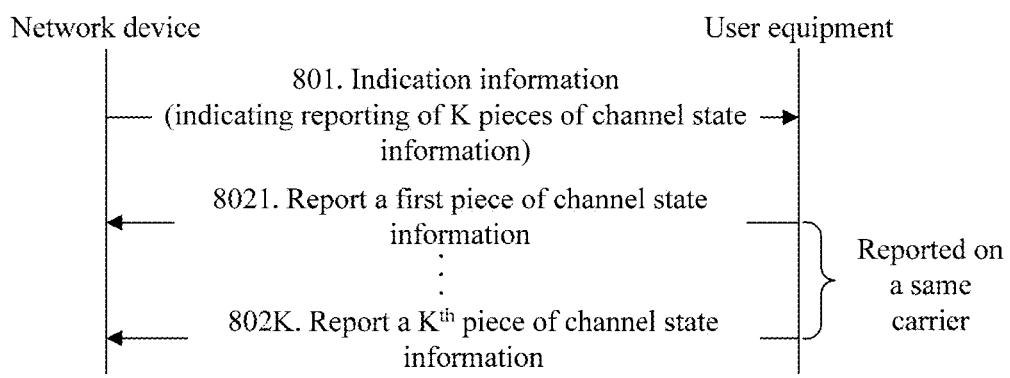
FIG. 8b is a schematic diagram of another channel state information reporting procedure according to an embodiment of the present invention.

Optionally, when the K pieces of CSI are the aperiodically reported CSI or the K pieces of semi-persistently reported CSI, the indication information includes information about T CSI reporting timing offsets, and the T CSI reporting timing offsets are used for the reporting of the K pieces of CSI, where T is an integer greater than or equal to 2, and the CSI reporting timing offset is a time gap between CSI reporting triggering and CSI reporting. Optionally, the CSI reporting timing offset may be measured in slots, or may be measured in units of another time domain resource, which is not limited in this application. When a capacity or resources are limited, although the K pieces of CSI are triggered in a piece of signaling, the network device may configure different CSI reporting timing offsets for the K pieces of CSI, to implement reporting of the K pieces of CSI at different times. In this case, the network device needs to wait for the reporting of K pieces of CSI, but compared with triggering the K pieces of CSI separately, this saves some time and shortens time required for the network device to receive all the K pieces of CSI. FIG. 8b is a schematic diagram of a CSI reporting procedure corresponding to this example. A network device instructs, by using a piece of indication information, user equipment to report K pieces of CSI (part 801). After receiving the indication information, the user equipment measures CSI based on CSI that is indicated by the indication information and that needs to be reported, and reports the K pieces of CSI separately on a same carrier at different moments based on CSI reporting timing offset values indicated by the indication information (parts 8021 to 802K). Optionally, the K pieces of CSI may correspond to K different CSI reporting timing offset values, or may correspond to less than K different CSI reporting timing offset values. In this case, at least two of the K CSI reports use a same CSI reporting timing offset value, that is, reporting is performed at the same time.

In a specific example, the network device and the user equipment may pre-agree on grouping of CSI reporting timing offset values. For example, groups of specific CSI reporting timing offset values may be preconfigured by using higher layer signaling (for example, RRC signaling), and then the indication information is used to indicate which specific group of CSI reporting timing offset values need to be used by the user equipment currently. For example, it is predefined that a first group of CSI reporting timing offset values are {1, 4}, a second group of CSI reporting timing offset values are {2, 4}, and a third group of CSI reporting timing offset values are {1, 3}. Based on the current example, Table 13 and Table 14 respectively provide two specific information element design methods for indicating the CSI reporting timing offset values. In Table 13, the indication information indicates only the CSI reporting timing offset values. In Table 14, the indication information indicates both the CSI reporting configuration groups and the CSI reporting timing offset values.

TABLE 13

| Value of CSI reporting timing offset | Description |
|---|---|
| '00' | No timing offset value is configured |
| '01' | A first group of CSI reporting timing offset values configured by a higher layer are triggered |
| '10' | A second group of CSI reporting timing offset values configured by a higher layer are triggered |
| '11' | A third group of CSI reporting timing offset values configured by a higher layer are triggered |

TABLE 14

| Value of CSI request field and value of CSI reporting timing offset | Description |
| --- | --- |
| '00' | No aperiodic CSI reporting is triggered |
| '01' | Aperiodic CSI reporting of a CSI reporting configuration set 1 configured by a higher layer is triggered, and a first group of CSI reporting timing offset values configured by a higher layer are triggered |
| '10' | Aperiodic CSI reporting of a CSI reporting configuration set 2 configured by a higher layer is triggered, and a second group of CSI reporting timing offset values configured by a higher layer are triggered |
| '11' | Aperiodic CSI reporting of a CSI reporting configuration set 3 configured by a higher layer is triggered, and a third group of CSI reporting timing offset values configured by a higher layer are triggered |

Optionally, corresponding to the different CSI reporting timing offset values, the network device may further configure a plurality of time-frequency resources for CSI reporting for the user equipment. For example, the indication information may further include at least one piece of time-frequency resource configuration information for CSI reporting. The user equipment reports, based on the CSI reporting timing offset values, at least one of the K pieces of CSI separately at different times by using different time-frequency resources.

Optionally, when the K pieces of CSI are the periodically reported CSI, the indication information is used to configure the reporting of the K pieces of CSI. After receiving the indication information, the user equipment performs periodic CSI reporting based on the indication information. Optionally, the indication information includes at least one of index information of reporting configurations for the K pieces of channel state information, reporting period information, and reporting subframe offset configuration (subframe offset configuration) information. Optionally, the K pieces of periodically reported CSI may have a same or different reporting periods, or may have a same or different reporting subframe offset configurations. When all the K pieces of periodically reported CSI have the same reporting period and the same reporting subframe offset configuration, the K pieces of periodically reported CSI are reported at the same time each time when being reported.

Optionally, the indication information in this embodiment of this application may further include beam information, the beam information is used to indicate beams used for reporting the K pieces of channel state information, and the beam information indicates L beams, where L is an integer greater than or equal to 1, and each of the L beams is used for reporting the K pieces of channel state information.

When L is 1, the user equipment sends the K pieces of CSI by using one configured beam. The K pieces of CSI may be sent at the same time, that is, the K pieces of CSI are sent at the same time by using the configured beam. Alternatively, the K pieces of CSI may be sent at different times, that is, the K pieces of CSI are sent separately at different moments by using the one configured beam.

Figure 9:
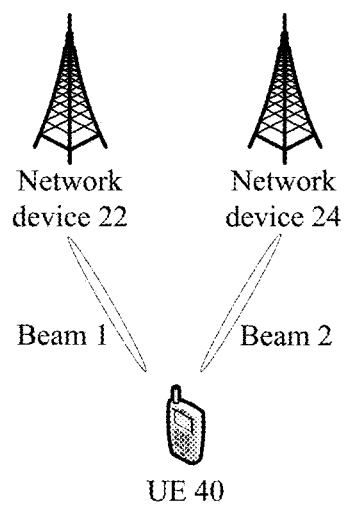
FIG. 9 is a schematic diagram of a channel state information reporting scenario according to an embodiment of the present invention.

When L is greater than or equal to 2, the user equipment sends the K pieces of CSI by using at least two configured beams, where each beam is used for sending the K pieces of CSI. For example, L=2, and FIG. 9 is a schematic diagram of a scenario in which user equipment sends K pieces of CSI by using two beams. In this example, UE 40 reports the K pieces of CSI to a network device 22 and a network device 24. A beam 1 points to the network device 22, and a beam 2 points to the network device 24. In other words, the UE 40 reports the K pieces of CSI to the network device 22 by using the beam 1, and reports the K pieces of CSI to the network device 24 by using the beam 2. The user equipment reports the K pieces of CSI by using different beams, so that a plurality of pieces of CSI can be reported to different network devices, and a probability that the different network devices correctly receive the K pieces of CSI can be improved. All the network devices receive the plurality of pieces of CSI reported by the user equipment, thereby shortening time for information transfer between the network devices, for example, shortening time required for CSI transfer between the network devices and facilitating faster coordination and scheduling between the network devices. Optionally, the plurality of network devices that receive the K pieces of CSI reported by the user equipment may include a serving network device and a coordinated network device, or all may be coordinated network devices. In this application, the serving network device is a network device that provides a higher layer connection (such as an RRC layer connection) for the user equipment. For example, the UE performs an initial connection establishment process or starts a connection re-establishment process in a cell provided by the serving network device. The coordinated network device is a non-serving network device that provides data transmission for the user equipment. Optionally, the indication information used to indicate the reporting of the K pieces of CSI described in this application may be sent by the serving network device, or may be provided by the coordinated network device.

Optionally, the beam information may be uplink beam information, for example, a channel sounding reference signal resource indication (SRI), or may be downlink beam information, for example, a CSI-RS resource indication (CRI). When the beam information is the downlink beam information, the user equipment may determine a used uplink beam with reference to the indicated downlink beam information and beam pair information.

In a specific example, the network device and the user equipment may pre-agree on grouping of beams. For example, groups of specific beams may be preconfigured by using higher layer signaling (for example, RRC signaling), and then the indication information is used to indicate which specific group of beams need to be used by the user equipment currently. For example, SRIs are used to indicate the beams, and it is predefined that a first group of SRIs are {SRI 1, SRI 2}, a second group of SRIs are {SRI 2, SRI 3}, and a third group of SRIs are {SRI 1, SRI 3}. Based on the current example, Table 15 and Table 16 respectively provide two specific information element designs for indicating the beam groups. In Table 15, the indication information indicates only the used beam groups. In Table 16, the indication information indicates both the CSI reporting configuration groups and the used beam groups.

TABLE 15

| Value of beam request field | Description |
| --- | --- |
| '00' | No beam is triggered |
| '01' | Aperiodic CSI is reported by using a first group of SRIs configured by a higher layer |

TABLE 15-continued

| Value of beam request field | Description |
| --- | --- |
| '10' | Aperiodic CSI is reported by using a first group of SRIs configured by a higher layer |
| '11' | Aperiodic CSI is reported by using a second group of SRIs configured by a higher layer |

TABLE 16

| Value of CSI request field and value of beam request field | Description |
| --- | --- |
| '00' | No aperiodic CSI reporting is triggered |
| '01' | Aperiodic CSI reporting of a CSI reporting configuration set 1 configured by a higher layer is triggered, and a first group of SRIs configured by a higher layer are used for reporting |
| '10' | Aperiodic CSI reporting of a CSI reporting configuration set 2 configured by a higher layer is triggered, and a second group of SRIs configured by a higher layer are used for reporting |
| '11' | Aperiodic CSI reporting of a CSI reporting configuration set 3 configured by a higher layer is triggered, and a third group of SRIs configured by a higher layer are used for reporting |

Optionally, for the use of each beam, reporting the K pieces of CSI by using different beams is the same as reporting the K pieces of CSI by using a single beam. The K pieces of CSI reported on one beam may be reported at different times, or may be reported at the same time. A specific implementation is the same as that described above, and details are not described again. For example, when being reported at different times, one or more pieces of the K pieces of CSI may be reported at a moment by using a plurality of beams, and the other one or more pieces of the K pieces of CSI may be reported at another moment by using the plurality of beams.

Optionally, when the K pieces of CSI reported by using each beam are reported at the same time, the L beams may be sent by using a same or different time domain resources.

Figure 10A:
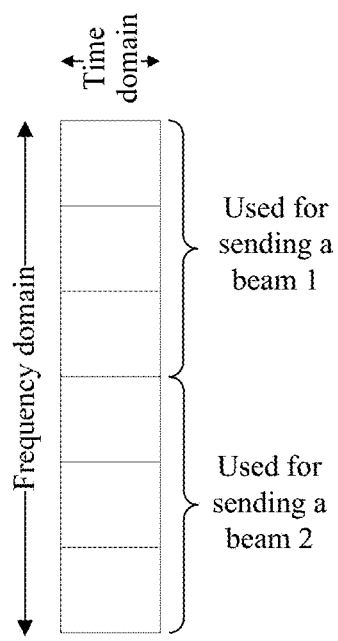
FIG. 10a is a schematic diagram of beam sending according to an embodiment of the present invention.

In a specific example, the L beams may be sent by using a same time domain resource and different frequency domain resources. In this case, the L beams are sent at the same time by using the different frequency domain resources, and each beam includes K CSI reports. Selection of the different frequency domain resources may be designed as required. For example, all subcarriers with an even subcarrier number are a group of frequency domain resources, and all subcarriers with an odd subcarrier number are another group of frequency domain resources. For another example, x consecutive subcarriers are a group of frequency domain resources. FIG. 10a illustrates two beams sent at the same time by using different frequency domain resources.

Figure 10B:
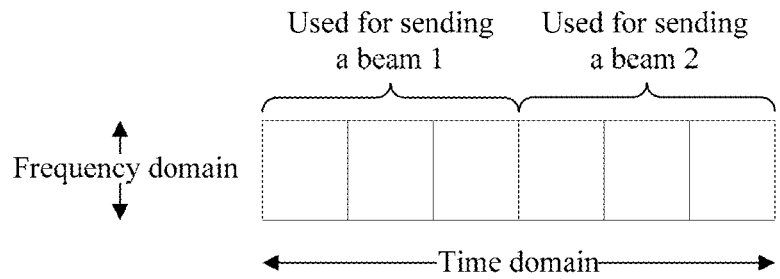
FIG. 10b is another schematic diagram of beam sending according to an embodiment of the present invention.
Figure 10C:
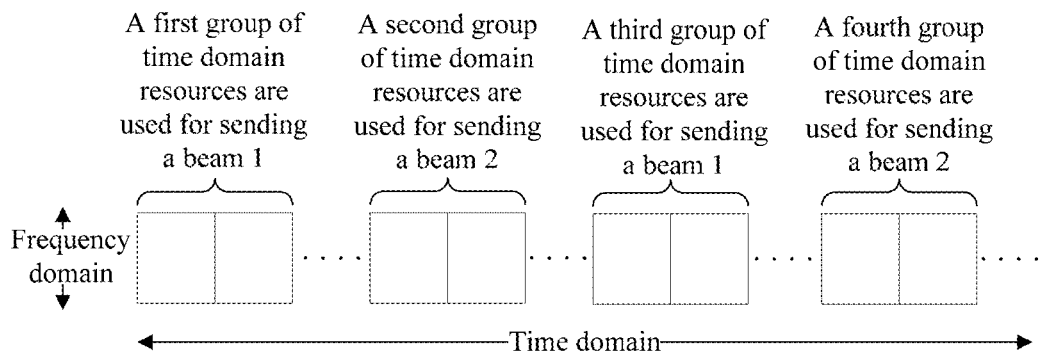
FIG. 10c is still another schematic diagram of beam sending according to an embodiment of the present invention.

In another specific example, the L beams may be sent by using different time domain resources, each beam includes K CSI reports, and a frequency domain resource used by each beam may be the same or different. Use and selection of the different time domain resources may be designed according to specific system requirements. For example, if a symbol (symbol) is used as a unit, all symbols with an odd symbol number are a group, used to send one beam, and all symbols with an even symbol number are a group, used to send another beam. For example, y consecutive symbols are a group, used to send one beam, and a specific symbol or slot gap may be set every y consecutive symbols. For the use of frequency domain resources, refer to the solution in the previous example, and details are not described herein. For example, in FIG. 10b and FIG. 10c, there are two beams, and two specific examples of sending different beams by using different time domain resources are provided. In FIG. 10b, the two beams are sent on two time domain resources by using a same frequency domain resource. FIG. 10c illustrates a case in which two beams are used alternately for sending. On a first group of time domain resources, the K pieces of CSI are reported by using a beam 1; on a second group of time domain resources, the K pieces of CSI are reported by using a beam 2; on a third group of time domain resources, the K pieces of CSI are reported by using the beam 1; . . . until time domain resources configured by a system are used up, or a quantity of reporting times reaches a preset value, or another condition for stopping reporting set by the system is met.

It should be noted that unit division of the time domain resources and the frequency domain resources shown in FIG. 10a to FIG. 10c may be performed based on design and requirements of the system. For example, one box shown in FIG. 10a to FIG. 10c may include at least one symbol, or may include at least one slot, or may include at least one time unit smaller than a symbol in time domain; and may include at least one subcarrier or the like in frequency domain.

Optionally, a specific sending manner of the L beams, for example, whether the L beams are sent at the same time or sent alternately, may be determined in a predefined or default manner, or may be dynamically or semi-persistently indicated by using signaling (for example, RRC signaling). For example, if a system default is that a plurality of beams are sent alternately, when the user equipment receives indication information of the plurality of beams, the user equipment may report the K pieces of CSI by using the plurality of beams alternately.

Optionally, joint coding may be used during the reporting of the K pieces of CSI. For example, there are two pieces of CSI, and in the two pieces of CSI, RIs are jointly coded, CQIs are jointly coded, and PMIs are jointly coded (where a first PMI in PMIs in a first piece of CSI and a first PMI in PMIs in a second piece of CSI are jointly coded, and a second PMI in the PMIs in the first piece of CSI and a second PMI in the PMIs in the second piece of CSI are jointly coded; or a first PMI and a second PMI in PMIs in a first piece of CSI are jointly coded, and a first PMI and a second PMI in PMIs in a second piece of CSI are jointly coded). For another example, an RI in a first piece of CSI, a first PMI in PMIs in the first piece of CSI, an RI in a second piece of CSI, and a first PMI in PMIs in the second piece of CSI are jointly coded; CQIs in the two pieces of CSI are jointly coded; and a second PMI in the PMIs in the first piece of CSI and a second PMI in the PMIs in the second piece of CSI are jointly coded. A specific joint coding scheme may be designed based on system requirements, and is not limited in this application.

An embodiment of this application provides an apparatus, and the apparatus is configured to implement functions of the network device in the foregoing embodiment. Optionally, the apparatus may be a network device, or may be another apparatus that can implement the corresponding functions, for example, a chip.

Figure 11A:
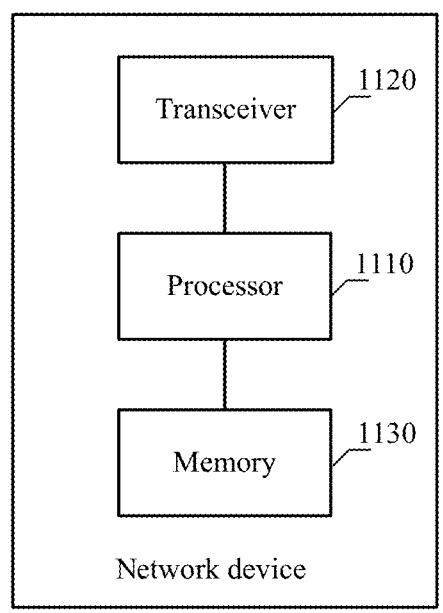
FIG. 11a is a schematic structural diagram of a network device according to an embodiment of the present invention.
Figure 11B:
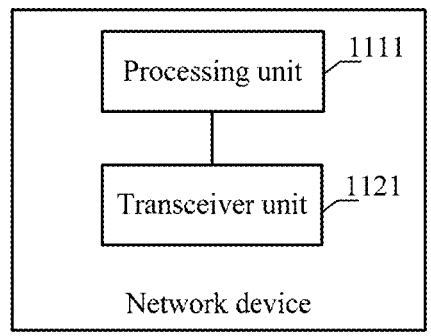
FIG. 11b is a schematic structural diagram of another network device according to an embodiment of the present invention.

FIG. 11a and FIG. 11b are schematic structural diagrams of a network device according to an embodiment of the present invention. The network device shown in FIG. 11a and FIG. 11b may be the network device (for example, the serving network device or the coordinated network device) in the embodiment shown in FIG. 7 to FIG. 10c. The network device shown in FIG. 11a and FIG. 11b may be configured to implement content that is implemented through participation of the network device in all the foregoing embodiments.

The network device shown in FIG. 11a includes a processor 1110, a transceiver 1120, and a memory 1130. The transceiver 1120 may be configured to support information sending and receiving between the network device and the UE in the foregoing embodiment. For example, the processor 1110 may determine specific content of to-be-sent indication information and/or generate the indication information, and the transceiver 1120 may send the indication information to the UE. Further, the transceiver 1120 may further send downlink data to the UE, and receive CSI reported by the UE and/or uplink data sent by the UE. The network device may further include a memory 1130, which may be configured to store program code and data of the network device. It may be understood that FIG. 11a shows only a simplified implementation of the network device.

The network device shown in FIG. 11b includes a processing unit 1111 and a transceiver unit 1121. The processing unit 1111 may be configured to determine specific content of to-be-sent indication information and/or generate the indication information, and the transceiver unit 1121 may be configured to send the indication information to the UE. Further, the transceiver unit 1121 may further send downlink data to the UE, and receive CSI reported by the UE and/or uplink data sent by the UE.

An embodiment of this application provides an apparatus, and the apparatus is configured to implement functions of the user equipment in the foregoing embodiment. Optionally, the apparatus may be user equipment, or may be another apparatus that can implement the corresponding functions, for example, a chip.

Figure 12A:
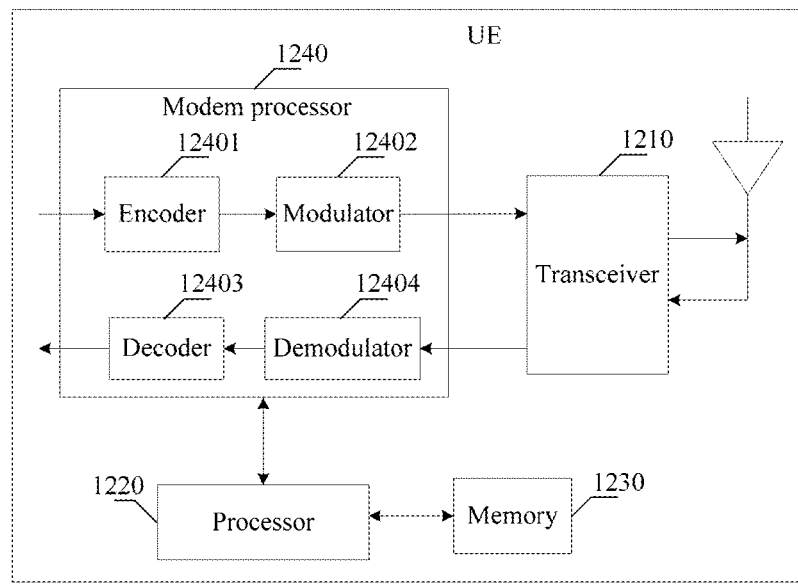
FIG. 12a is a schematic structural diagram of UE according to an embodiment of the present invention.
Figure 12B:
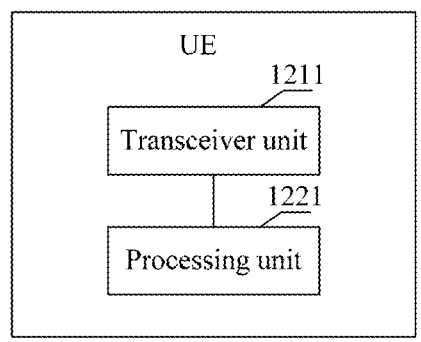
FIG. 12b is a schematic structural diagram of another UE according to an embodiment of the present invention.

FIG. 12a and FIG. 12b are schematic diagrams of an embodiment of UE according to the present invention. The UE shown in FIG. 12a and FIG. 12b may be the UE in the embodiment shown in FIG. 7 to FIG. 10c. The UE shown in FIG. 12a and FIG. 12b may be configured to implement content that is implemented through participation of the UE in the embodiment shown in FIG. 7 to FIG. 10c, including all content such as receiving the indication information and/or reporting the CSI in all the foregoing embodiments.

The UE shown in FIG. 12a includes a transceiver 1210 and a processor 1220, and may further include a memory 1230 and a modem processor 1240.

On an uplink, the transceiver 1210 processes (for example, performs analog conversion, filtering, amplification, and up-conversion on) an output sample that is output by the modem processor 1240 and generates an uplink signal, and the uplink signal is transmitted through an antenna to the network device described in the foregoing embodiment. On a downlink, the antenna receives a downlink signal transmitted by the network device in the foregoing embodiment, and the transceiver 1210 processes (for example, performs filtering, amplification, down-conversion, and digitalization on) the signal received from the antenna and provides an input sample to the modem processor 1240. For example, the transceiver 1210 may receive indication information sent by the network device. Further, the transceiver 1210 may receive downlink data sent by at least one network device, or report the K pieces of CSI and/or send uplink data to the at least one network device. In the modem processor 1240, an encoder 12401 receives service data and a signaling message that are to be sent on the uplink, and processes (for example, performs formatting, encoding, and interleaving on) the service data and the signaling message. A modulator 12402 further processes (for example, performs symbol mapping and modulation on) the encoded service data and signaling message and provides an output sample. A demodulator 12404 processes (for example, demodulates) the input sample and provides a symbol estimate. A decoder 12403 processes (for example, de-interleaves and decodes) the symbol estimate and provides decoded data and signaling message that are to be sent to the UE. The encoder 12401, the modulator 12402, the demodulator 12404, and the decoder 12403 may be implemented by using the integrated modem processor 1240. These components are processed based on a radio access technology used by a radio access network. The processor 1220 performs control and management on actions of the UE, and is configured to execute processing performed by the UE in the foregoing embodiment. For example, the processor 1220 may determine and/or generate, based on the indication information, K pieces of CSI obtained on a same carrier. Specifically, the processor 1220 may determine and/or generate specific content of the K pieces of CSI based on CSI reporting configuration information indicated in the indication information. The processor 1220 is configured to support the UE in performing content of the UE in the embodiment of the present invention. The memory 1230 is configured to store program code and data for the UE.

As shown in FIG. 12b, an embodiment of the present invention provides another example of UE. The UE includes a transceiver unit 1211 and a processing unit 1221. The transceiver unit 1211 may be configured to receive indication information sent by a network device, and may further receive downlink data sent by at least one network device, or report K pieces of CSI and/or send uplink data to the at least one network device. The processing unit 1221 may be configured to determine and/or generate, based on the indication information, K pieces of CSI obtained on a same carrier.

A person skilled in the art can understand that information and signals may be expressed by using any technology techniques. For example, data (data), an instruction a command, the information, the signals, a bit, a symbol, and a chip may be expressed by a voltage, a current, an electromagnetic wave, a magnetic field or a magnetic particle, an optical field or an optical particle, or any combination thereof.

A person skilled in the art may further understand that various illustrative logical blocks (illustrative logic block) and stepsthat are listed in the embodiments of the present invention may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on implementation requirements of particular applications and the entire system. A person of ordinary skill in the art may use various methods to implement the described functions for each particular application, but it should not be considered that the implementation goes beyond the scope of the embodiments of the present invention.

The various illustrative logical blocks, modules, and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or an implementation of any combination thereof. The general processor may be a microprocessor. Optionally, the general processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of the present invention may be directly embedded into hardware, a software module executed by a processor, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in a user terminal. Alternatively, the processor and the storage medium may also be arranged in different components of the user terminal.

In one or more examples of implementations, the functions described in the embodiments of the present invention may be implemented by hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and implementations, but may also be extended to a maximum scope that is consistent with the principles and disclosed new features of the present invention.

What is claimed is:

1. A channel state information measurement method, comprising:
   receiving, by a terminal, configuration information for channel state information measurements to be performed by the terminal from a radio network device, wherein the configuration information comprises information about one or more resources for the channel state information measurements and indicates information about a measurement attribute of the one or more resources, wherein
   the configuration information for the channel state information measurements includes measurements for the radio network device and at least one another network device;
   the measurement attribute comprises X number of types of interference measurement; or channel measurement and X number of types of interference measurement, wherein X is an integer greater than or equal to 2, and the X number of types of interference measurement includes obtaining an unprecoded interference by using a resource of a non-zero power channel state information reference signal, and obtaining a precoded interference by using a non-zero power demodulation reference signal; and
   the channel state information measurement to be performed by the terminal comprises at least two different types of channel state information measurements to be performed by the terminal, the at least two different types of channel state information measurements including one channel measurement and one interference measurement; and
   measuring, by the terminal, channel state information based on the configuration information, and feeding back the channel state information.

2. The method according to claim 1, wherein the information about the one or more resources for the channel state information measurements to be performed by the terminal comprises information about resources available for channel measurement and information about resources for interference measurement, and the configuration information further comprises at least one of:
   second indication information, to indicate a quantity M of resources that are actually used for channel measurement, wherein M is an integer not less than 1; or
   third indication information, to indicate a quantity N of resources that are actually used for interference measurement, wherein N is an integer not less than 0.

3. The method according to claim 2, further comprising:
   determining, by the user equipment based on the second indication information, the M resources that are used for channel measurement in the resources available for channel state information; and, wherein performing channel state information measurement comprises:

performing channel measurement on the resources that are used for channel measurement and performing interference measurement on a resource other than the M resources in the resources available for channel state information measurement.

4. The method according to claim 2, wherein measuring and feeding back the channel state information comprises:
determining, by the terminal, based on the third indication information, the N resources that are actually used for interference measurement in the resources available for channel state information, and performing channel state information measurement and feedback based on the resources for channel measurement; and, wherein performing the channel state information measurement based on the resources for channel measurement comprises: performing channel measurement on the resources for channel measurement and performing interference measurement on the N resources.

5. The method according to claim 1, wherein that the configuration information indicates information about a measurement attribute of the one or more resources comprises:
the configuration information comprises first indication information used to indicate the measurement attributes; or
a resource or format of the configuration information is used to indicate the measurement attribute of the resource.

6. The method according to claim 1, wherein the X number of types of interference measurement further comprise at least one of:
measuring an interference by using a zero power reference signal,
obtaining one or more weakest interferences by using a resource of a non-zero power channel state information reference signal,
obtaining all interferences corresponding to all selectable precoding matrices in an available codebook by using a resource of a non-zero power channel state information reference signal,
obtaining a non-strongest or -weakest interference corresponding to a specific precoding matrix by using a resource of a non-zero power channel state information reference signal, or
obtaining one or more strongest interferences by using a resource of a non-zero power channel state information reference signal.

7. The method according to claim 5, wherein there is at least one resource for channel state information measurement, the first indication information used to indicate the measurement attribute of the resource comprises several elements, and each of the several elements is used to indicate a measurement attribute of each of the at least one resource.

8. The method according to claim 1, wherein the one or more resources for channel state information measurement have one type of measurement attribute, or have more than one type of measurement attribute.

9. The method according to claim 1, wherein one type of measurement attribute corresponds to one resource for channel state information measurement, or one type of measurement attribute corresponds to more than one resource for channel state information measurement.

10. The method according to claim 1, wherein there are at least two resources corresponding to the channel measurement in the measurement attributes, and the measuring, by the terminal, channel state information based on the configuration information, and feeding back the channel state information comprises:
measuring and feeding back, by the terminal, channel state information based on at least one of the at least two resources, wherein the measurement comprises performing channel measurement on the at least one of the at least two resources and performing interference measurement on a resource other than the at least one of the at least two resources for channel measurement.

11. The method according to claim 1, wherein the information about the resource for channel state information measurement comprises information about resources available for channel measurement and information about resources for interference measurement, and the configuration information further comprises fourth indication information, to indicate a quantity Y of transmission sets, wherein Y is an integer, and the method further comprises:
determining, based on the quantity Y of transmission sets that is indicated by the fourth indication information, Z resources that are actually used for channel measurement in the resources available for channel measurement;
wherein measuring the channel state information comprises:
performing channel measurement on the Z resources that are actually used for channel measurement and performing interference measurement on a resource other than the Z resources in the resources available for channel state information measurement, where $Z=k*Y$, k is a quantity of resources for channel measurement included in each transmission set, and k is an integer not less than 1.

12. The method according to claim 1, wherein the configuration information is radio resource control (RRC) signaling or downlink control information (DCI) signaling.

13. The method according to claim 1, wherein measuring the channel state information comprises: measuring, by the terminal, based on demodulation reference signal (DMRS), an interference caused by a second terminal, wherein the second terminal is paired with the terminal for implementing an multi-user multiple-input multiple-output (MU-MIMO), or the second terminal is scheduled by another cell different from a cell in which the terminal is located, wherein the measured interference is precoded.

14. An apparatus, comprising a processor, and a memory, wherein
the memory is configured to store an instruction, the processor is configured to execute the instruction stored in the memory, to cause a terminal to perform the following:
receiving configuration information for channel state information measurement from a radio network device, wherein the configuration information comprises information about one or more resources for channel state information measurements to be performed by the terminal and indicates information about a measurement attribute of the one or more resources, wherein
the configuration information for the channel state information measurements includes measurements for the radio network device and at least one another network device;
the measurement attribute comprises X number of types of interference measurement, wherein X is an integer greater than or equal to 2, and the X number of types of interference measurement includes obtaining an unprecoded interference by using a resource of a non-zero power channel state information reference signal, and obtaining a precoded interference by using a non-zero power demodulation reference signal; and the channel state information measurement to be performed by the terminal comprises at least two different types of channel state information measurements to be performed by the terminal, the at least two different types of channel state information measurements including one channel measurement and one interference measurement; and measuring channel state information based on the configuration information, and feeding back the channel state information.

15. The apparatus according to claim 14, wherein the information about the one or more resources for the channel state information measurements comprises information about resources available for channel measurement and information about resources for interference measurement, and the configuration information further comprises at least one of:

second indication information, to indicate a quantity M of resources that are actually used for channel measurement, wherein M is an integer not less than 1; or the information about the resource for channel state information measurement comprises information about resources for channel measurement and information about resources available for interference measurement, and the configuration information further comprises third indication information, to indicate a quantity N of resources that are actually used for interference measurement, wherein N is an integer not less than 0.

16. The apparatus according to claim 14, wherein that the configuration information indicates information about a measurement attribute of the one or more resources comprises:

the configuration information comprises first indication information used to indicate the measurement attributes; or a resource or format of the configuration information is used to indicate the measurement attribute of the resource.

17. The apparatus according to claim 14, wherein the X number of types of interference measurement further comprise at least one of:

measuring an interference by using a zero power reference signal, obtaining one or more weakest interferences by using a resource of a non-zero power channel state information reference signal, obtaining an unprecoded interference by using a resource of a non-zero power channel state information reference signal, obtaining all interferences corresponding to all selectable precoding matrices in an available codebook by using a resource of a non-zero power channel state information reference signal, obtaining a non-strongest or -weakest interference corresponding to a specific precoding matrix by using a resource of a non-zero power channel state information reference signal, or obtaining a precoded interference by using a non-zero power demodulation reference signal.

18. The apparatus according to claim 16, wherein there is at least one resource for channel state information measurement, the first indication information used to indicate the measurement attribute of the resource comprises several elements, and each of the several elements is used to indicate a measurement attribute of each of the at least one resource.

19. The apparatus according to claim 14, wherein the resources for channel state information measurement have one type of measurement attribute, or have more than one type of measurement attribute.

20. The apparatus according to claim 14, wherein one type of measurement attribute corresponds to one resource for channel state information measurement, or one type of measurement attribute corresponds to more than one resource for channel state information measurement.

21. The apparatus according to claim 14, wherein there are at least two resources corresponding to the channel measurement in the measurement attributes, and the measuring channel state information based on the configuration information, and feeding back the channel state information comprises:

measuring and feeding back, by the terminal, channel state information based on at least one of the at least two resources, wherein the measurement comprises performing channel measurement on the at least one of the at least two resources and performing interference measurement on a resource other than the at least one of the at least two resources for channel measurement.

22. The apparatus according to claim 14, wherein the information about the resource for channel state information measurement comprises information about resources available for channel measurement and information about resources for interference measurement, and the configuration information further comprises fourth indication information, to indicate a quantity Y of transmission sets, wherein Y is an integer.

23. The apparatus according to claim 14, wherein the configuration information is radio resource control (RRC) signaling or downlink control information (DCI) signaling.

* * * * *